United States Patent
Gao et al.

(10) Patent No.: US 12,184,361 B2
(45) Date of Patent: Dec. 31, 2024

(54) LOW OVERHEAD CHANNEL STATE INFORMATION (CSI) FEEDBACK FOR MULTI-TRANSMISSION POINT (TRP) TRANSMISSION

(71) Applicant: Telefonaktiebolaget LM Ericsson (publ), Stockholm (SE)

(72) Inventors: Shiwei Gao, Nepean (CA); Sebastian Faxér, Stockholm (SE); Mattias Frenne, Uppsala (SE); Siva Muruganathan, Stittsville (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 638 days.

(21) Appl. No.: 17/421,787

(22) PCT Filed: Jan. 8, 2020

(86) PCT No.: PCT/IB2020/050128
§ 371 (c)(1),
(2) Date: Jul. 9, 2021

(87) PCT Pub. No.: WO2020/144602
PCT Pub. Date: Jul. 16, 2020

(65) Prior Publication Data
US 2022/0094399 A1 Mar. 24, 2022

Related U.S. Application Data

(60) Provisional application No. 62/791,145, filed on Jan. 11, 2019.

(51) Int. Cl.
*H04B 7/0417* (2017.01)
*H04B 7/0456* (2017.01)
(Continued)

(52) U.S. Cl.
CPC ......... *H04B 7/0417* (2013.01); *H04B 7/0486* (2013.01); *H04B 7/0626* (2013.01);
(Continued)

(58) Field of Classification Search
CPC .. H04B 7/0417; H04B 7/0486; H04B 7/0626; H04B 7/0632; H04B 7/0639;
(Continued)

(56) References Cited

U.S. PATENT DOCUMENTS 9,019,902 B2 * 4/2015 Damnjanovic ... H04L 25/03343
370/329
9,698,951 B2 * 7/2017 Kim ...................... H04L 5/0057
(Continued)

FOREIGN PATENT DOCUMENTS

CN 103918208 A 7/2014
CO NC2018/0013821 1/2019
(Continued)

OTHER PUBLICATIONS

Indian Examination Report dated Mar. 4, 2022 issued in corresponding Indian Application No. 202147035498, consisting of 7 pages.
(Continued)

*Primary Examiner* — Ahmed Elallam
(74) *Attorney, Agent, or Firm* — Weisberg I.P. Law, P.A.

(57) ABSTRACT

Methods and apparatuses are disclosed for low overhead CSI feedback for multi-trp transmissions. In one embodiment, a method implemented in a wireless device includes receiving a configuration of a channel state information, CSI, report setting for at least K>1 non-zero power channel state information reference signal, NZP CSI-RS, resources for channel measurement and a report quantity configuration, K being an integer; receiving a CSI feedback report request for CSI measurement and feedback based at least in
(Continued)

part on the CSI report setting; measuring channels based at least in part on the NZP CSI-RS resources; and sending a channel state information, CSI, feedback report based at least in part on: the channel measurements; and the report quantity configuration; and the CSI feedback report comprising at least one of a first CSI feedback and a second CSI feedback.

20 Claims, 13 Drawing Sheets

(51) Int. Cl.
*H04B 7/06* (2006.01)
*H04L 5/00* (2006.01)

(52) U.S. Cl.
CPC ......... *H04B 7/0632* (2013.01); *H04B 7/0639* (2013.01); *H04B 7/0658* (2013.01); *H04L 5/0048* (2013.01)

(58) Field of Classification Search
CPC ... H04B 7/0658; H04L 5/0035; H04L 5/0057; H04L 1/0026
See application file for complete search history.

(56) References Cited

U.S. PATENT DOCUMENTS

| | | | | |
|---|---|---|---|---|
| 10,009,813 | B2 | 6/2018 | Sirotkin et al. | |
| 10,348,383 | B2* | 7/2019 | Jeong | H04B 7/0478 |
| 10,447,368 | B2* | 10/2019 | Gao | H04L 5/0023 |
| 10,448,408 | B2* | 10/2019 | Nam | H04L 5/0035 |
| 10,778,348 | B2* | 9/2020 | Gao | H04L 5/0057 |
| 11,012,878 | B2* | 5/2021 | Lee | H04B 7/0478 |
| 11,258,499 | B2* | 2/2022 | Park | H04B 7/0695 |
| 11,399,299 | B2* | 7/2022 | Liu | H04L 5/0048 |
| 11,716,647 | B2* | 8/2023 | Liu | H04W 24/10 370/252 |
| 11,736,210 | B2* | 8/2023 | Gao | H04L 5/005 375/262 |
| 11,750,250 | B2* | 9/2023 | Wang | H04W 80/08 370/329 |
| 11,757,495 | B2* | 9/2023 | Faxér | H04B 7/0802 370/329 |
| 11,916,845 | B2* | 2/2024 | Rahman | H04W 72/21 |
| 12,052,199 | B2* | 7/2024 | Gao | H04L 5/005 |
| 2012/0287799 | A1 | 11/2012 | Chen et al. | |
| 2019/0081676 | A1* | 3/2019 | Wei | H04L 1/0026 |
| 2023/0007517 | A1 | 1/2023 | Wang et al. | |

FOREIGN PATENT DOCUMENTS

| | | | |
|---|---|---|---|
| WO | WO-2013023290 A1 * | 2/2013 | ............ H04B 7/024 |
| WO | 2018/229078 A1 | 12/2018 | |
| WO | 2022/009151 A1 | 1/2022 | |

OTHER PUBLICATIONS

International Search Report and Written Opinion dated Apr. 22, 2020 issued in PCT Application No. PCT/IB2020/050128, consisting of 16 pages.

3GPP TSG RAN WG1 Meeting NR#3; R1-1715798; Source: CATT; Title: Considerations on DL Multi-Panel and Multi-TRP Transmission; Agenda Item: 6.2.1.6; Document for: Discussion and Decision; Nagoya, Japan, Sep. 18-21, 2017, consisting of 4 pages.

3GPP TSG-RAN WG1 #91; R1-1720974; Source: Ericsson; Title: CSI Feedback for Multi-TRP; Agenda Item: 7.2.2.6; Document for: Discussion and Decision; Reno, USA, Nov. 27-Dec. 1, 2017, consisting of 9 pages.

3GPP TSG RAN WG1 Meeting #89; R1-1707915; Source: Samsung; Title: Enhancement to CSI Feedback; Agenda Item: 6.2.4.3; Document for: Discussion and Decision; Hangzhou, China, May 15-19, 2017, consisting of 5 pages.

3GPP TS 38.331 V15.3.0 (Sep. 2018) 3rd Generation Partnership Project; Technical Specification Group Radio Access Network; NR; Radio Resource Control (RRC) Protocol Specification (Release 15), consisting of 445 pages.

3GPP TS 38.211 V15.4.0 (Dec. 2018) 3rd Generation Partnership Project; Technical Specification Group Radio Access Network; NR; Physical Channels and Modulation (Release 15), consisting of 96 pages.

3GPP TS 38.212 V15.4.0 (Dec. 2018) 3rd Generation Partnership Project; Technical Specification Group Radio Access Network; NR; Multiplexing and Channel Coding (Release 15), consisting of 10 pages.

Colombian Office Action and English language translation of the Colombian Office Action dated Dec. 29, 2023 issued in corresponding Colombian Patent Application No. NC2021/0010364, consisting of 17 pages.

Chinese Office Action and English language translation of the text of the Chinese First Office Action dated Jan. 25, 2024 issued in corresponding Chinese Patent Application No. 2020800201432, consisting of 11 pages.

Colombian Office Action and English language translation of the Colombian Office Action dated Sep. 2, 2024 issued in corresponding Colombian Patent Application No. NC2021/0010364, consisting of 27 pages.

* cited by examiner

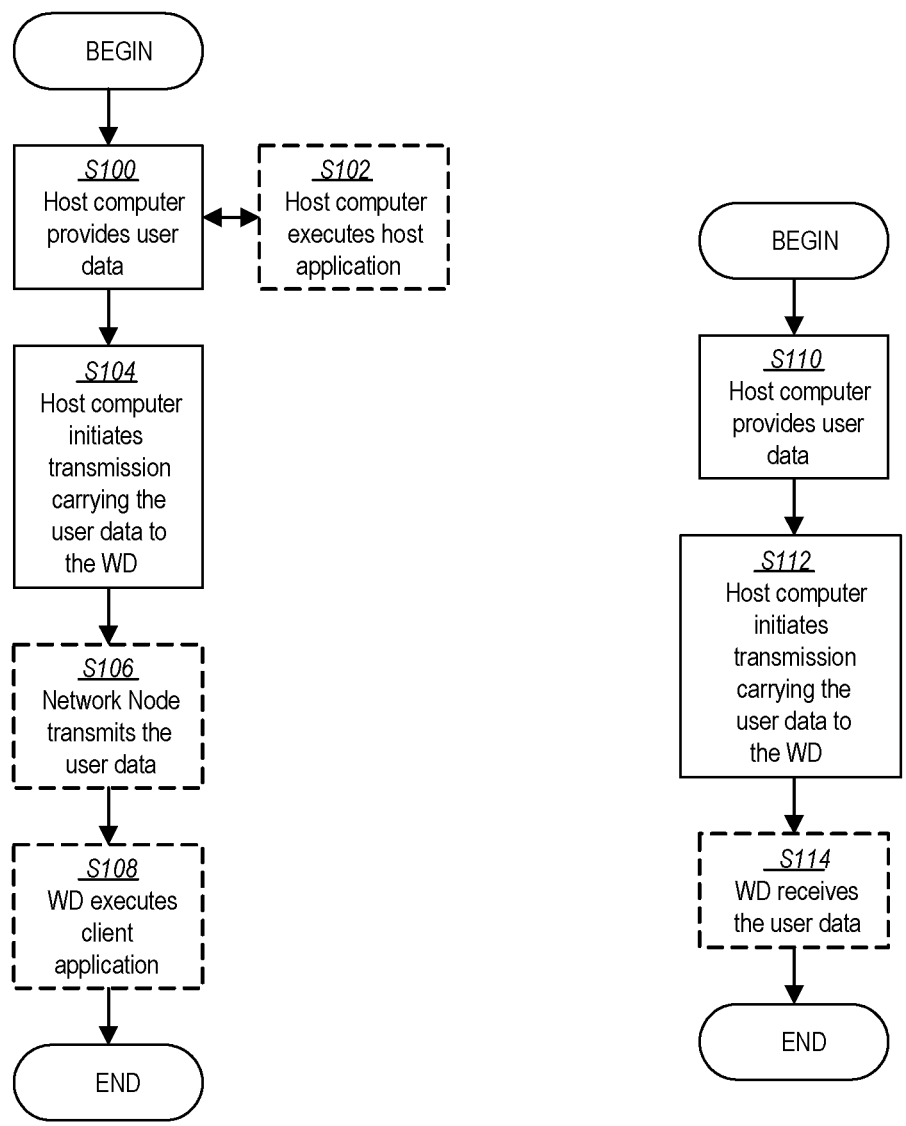

LOW OVERHEAD CHANNEL STATE INFORMATION (CSI) FEEDBACK FOR MULTI-TRANSMISSION POINT (TRP) TRANSMISSION

CROSS-REFERENCE TO RELATED APPLICATIONS

This application is a Submission Under 35 U.S.C. § 371 for U.S. National Stage Patent Application of International Application No.: PCT/IB2020/050128, filed Jan. 8, 2020 entitled "LOW OVERHEAD CHANNEL STATE INFORMATION (CSI) FEEDBACK FOR MULTI-TRANSMISSION POINT (TRP) TRANSMISSION," which claims priority to U.S. Provisional Application No. 62/791,145, filed Jan. 11, 2019, entitled "LOW OVERHEAD CHANNEL STATE INFORMATION (CSI) FEEDBACK FOR MULTI-TRANSMISSION POINT (TRP) TRANSMISSION," the entireties of both of which are incorporated herein by reference.

TECHNICAL FIELD

The present disclosure relates to wireless communications, and in particular, to low overhead channel state information (CSI) feedback for multi-transmission point (TRP) transmission.

BACKGROUND

The next generation mobile wireless communication system (3$^{rd}$ Generation Partnership Project (3GPP) 5$^{th}$ Generation (5G)) or New Radio (NR), may support a diverse set of use cases and a diverse set of deployment scenarios. The latter includes deployment at both low frequencies (e.g., below 6 GHz) and very high frequencies (e.g., up to 10's of GHz).

Similar to Long Term Evolution (LTE), NR uses Cyclic Prefix Orthogonal Frequency Division Multiplexing (CP-OFDM) in the downlink (i.e., from a network node, gNB, eNB, or base station, to a wireless device (WD) such as a user equipment (UE)) and both CP-OFDM and DFT-S-OFDM (DFT-spread OFDM) in the uplink (i.e., from WD to network node (e.g., gNB)). In the time domain, NR downlink and uplink may be organized into equally-sized subframes of 1 millisecond (ms) each. A subframe may be further divided into multiple slots of equal duration.

The slot length may depend on subcarrier spacing. For subcarrier spacing of Δf=15 kHz, there may be only one slot per subframe and each slot may include 14 OFDM symbols.

Data scheduling in NR can be in slot basis as in LTE, an example of which is shown in FIG. 1 with a 14-symbol slot, where the first two symbols contain physical downlink control channel (PDCCH) and the rest contain physical data channel (PDCH) (e.g., either physical downlink data channel (PDSCH), or physical uplink data channel (PUSCH).

Different subcarrier spacing values are supported in NR. The supported subcarrier spacing values (also referred to as different numerologies) may be given by Δf=(15×2$^a$) kHz where a is a non-negative integer (Δf=15 kHz is the basic subcarrier spacing that is also used in LTE). The slot durations at different subcarrier spacings are shown in Table 1, as an example.

TABLE 1

Slot length at different numerologies.

| Numerology | Slot length | RB BW |
|---|---|---|
| 15 kHz | 1 ms | 180 kHz |
| 30 kHz | 0.5 ms | 360 kHz |
| 60 kHz | 0.25 ms | 720 kHz |
| 120 kHz | 125 µs | 1.44 MHz |
| 240 kHz | 62.5 µs | 2.88 MHz |

In the frequency domain, a system bandwidth may be divided into resource blocks (RBs), each corresponding to 12 contiguous subcarriers. The RBs may be numbered starting with 0 from one end of the system bandwidth. An example of the basic NR physical time-frequency resource grid is illustrated in FIG. 2, where only one resource block (RB) within a 14-symbol slot is shown. One OFDM subcarrier during one OFDM symbol interval forms one resource element (RE).

Downlink (from base station to wireless device) transmissions may be dynamically scheduled, i.e., in each slot the network node (e.g., gNB) may transmit downlink control information (DCI) over the physical downlink control channel (PDCCH) about which WD data is to be transmitted to and which RBs in the current downlink slot the data is transmitted on. The PDCCH is typically transmitted in the first one or two OFDM symbols in each slot in NR. The WD data are carried on PDSCH. A WD may first detect and decode PDCCH and, if the decoding is successful, the WD then decodes the corresponding PDSCH based on the decoded control information in the PDCCH.

Uplink data transmission may also be dynamically scheduled using PDCCH. Similar to downlink, a WD first decodes uplink grants in PDCCH and then transmits data over PUSCH based the decoded control information in the uplink grant such as modulation order, coding rate, uplink resource allocation, etc.

Spatial Multiplexing

Multi-antenna techniques can significantly increase the data rates and reliability of a wireless communication system. The performance can be improved if both the transmitter and the receiver are equipped with multiple antennas, which results in a multiple-input multiple-output (MIMO) communication channel. Such systems and/or related techniques are commonly referred to as MIMO.

A component of NR is the support of MIMO antenna deployments and MIMO related techniques. Spatial multiplexing is one of the MIMO techniques used to achieve high data rates in favorable channel conditions. An illustration of an example of the spatial multiplexing operation is provided in FIG. 3.

As seen in FIG. 3, the information carrying symbol vector s=[s$_1$, s$_2$, ..., s$_r$]$^T$ is multiplied by an N$_T$×r precoder matrix W, which serves to distribute the transmit energy in a subspace of the N$_T$ (corresponding to N$_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a MIMO layer and r is referred to as the transmission rank. In this way, spatial multiplexing is achieved since multiple symbols can be transmitted simultaneously over the same time and frequency resource element (RE). The number of symbols r is typically adapted to suit the current channel properties.

The received signal at a WD with $N_R$ receive antennas at a certain RE n may be given by $$y_n = H_n W s + e_n,$$

where $y_n$ is a $N_R \times 1$ received signal vector, $H_n$ a $N_R \times N_T$ channel matrix at the RE, $e_n$ is a $N_R \times 1$ noise and interference vector received at the RE by the WD. The precoder W can be a wideband precoder, which is constant over frequency, or frequency selective (i.e., different over frequency).

The precoder matrix is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the WD. In addition, the precoder matrix may also be selected to strive for orthogonalizing the channel, meaning that after proper linear equalization at the WD, the inter-layer interference is reduced.

The transmission rank, and thus the number of spatially multiplexed layers, is reflected in the number of columns of the precoder. The transmission rank is also dependent on the Signal-to-noise-plus-interference ratio (SINR) observed at the WD. Typically, a higher SINR is required for transmissions with higher ranks. For efficient performance, a transmission rank that matches the channel properties as well as the interference may be selected. The precoding matrix, the transmission rank, and the channel quality may be part of channel state information (CSI), which is typically measured by a WD and fed back to a network node or gNB.

NR MIMO Data Transmission

An example of NR data transmission over multiple MIMO layers is shown in FIG. 4. Depending on the total number of MIMO layers or the rank, either one code word (CW) or two codewords may be used. In NR Release-15, one code word is used when the total number of layers is equal or less than 4 and two codewords are used when the number of layers is more than 4. Each codeword can include the encoded data bits of a transport block (TB). After bit-level scrambling, the scrambled bits may be mapped to complex-valued modulation symbols $d^{(q)}(0), \ldots, d^{(q)}(M_{symb}^{(q)}-1)$ for codeword q. The complex-valued modulation symbols may then be mapped onto the layers $x(i) = [x^{(0)}(i) \ldots x^{(v-1)}(i)]^T$, $i = 0, 1, \ldots, M_{symb}^{layer}-1$, according to Table 7.3.1.3-1 of $3^{rd}$ Generation Partnership Project (3GPP) Technical Specification (TS) 38.211 (which is reproduced herein below), where v is the number of layers and $M_{symb}^{layer}$ is the number of modulation symbols per layer.

TABLE 7.3.1.3-1

Codeword-to-layer mapping for spatial multiplexing.

| Number of layers | Number of codewords | Codeword-to-layer mapping $i = 0, 1, \ldots, M_{symb}^{layer}-1$ |
|---|---|---|
| 1 | 1 | $x^{(0)}(i) = d^{(0)}(i)$ $M_{symb}^{layer} = M_{symb}^{(0)}$ |
| 2 | 1 | $x^{(0)}(i) = d^{(0)}(2i)$ $M_{symb}^{layer} = M_{symb}^{(0)}/2$ |
|   |   | $x^{(1)}(i) = d^{(0)}(2i + 1)$ |
| 3 | 1 | $x^{(0)}(i) = d^{(0)}(3i)$ $M_{symb}^{layer} = M_{symb}^{(0)}/3$ |
|   |   | $x^{(1)}(i) = d^{(0)}(3i + 1)$ |
|   |   | $x^{(2)}(i) = d^{(0)}(3i + 2)$ |
| 4 | 1 | $x^{(0)}(i) = d^{(0)}(4i)$ $M_{symb}^{layer} = M_{symb}^{(0)}/4$ |
|   |   | $x^{(1)}(i) = d^{(0)}(4i + 1)$ |
|   |   | $x^{(2)}(i) = d^{(0)}(4i + 2)$ |
|   |   | $x^{(3)}(i) = d^{(0)}(4i + 3)$ |
| 5 | 2 | $x^{(0)}(i) = d^{(0)}(2i)$ $M_{symb}^{layer} = M_{symb}^{(0)}/2 = M_{symb}^{(1)}/3$ |
|   |   | $x^{(1)}(i) = d^{(0)}(2i + 1)$ |
|   |   | $x^{(2)}(i) = d^{(1)}(3i)$ |
|   |   | $x^{(3)}(i) = d^{(1)}(3i + 1)$ |
|   |   | $x^{(4)}(i) = d^{(1)}(3i + 2)$ |
| 6 | 2 | $x^{(0)}(i) = d^{(0)}(3i)$ $M_{symb}^{layer} = M_{symb}^{(0)}/3\; M_{symb}^{(1)}/3$ |
|   |   | $x^{(1)}(i) = d^{(0)}(3i + 1)$ |
|   |   | $x^{(2)}(i) = d^{(0)}(3i + 2)$ |
|   |   | $x^{(3)}(i) = d^{(1)}(3i)$ |
|   |   | $x^{(4)}(i) = d^{(1)}(3i + 1)$ |
|   |   | $x^{(5)}(i) = d^{(1)}(3i + 2)$ |
| 7 | 2 | $x^{(0)}(i) = d^{(0)}(3i)$ $M_{symb}^{layer} = M_{symb}^{(0)}/3 = M_{symb}^{(1)}/4$ |
|   |   | $x^{(1)}(i) = d^{(0)}(3i + 1)$ |
|   |   | $x^{(2)}(i) = d^{(0)}(3i + 2)$ |
|   |   | $x^{(3)}(i) = d^{(1)}(4i)$ |
|   |   | $x^{(4)}(i) = d^{(1)}(4i + 1)$ |
|   |   | $x^{(5)}(i) = d^{(1)}(4i + 2)$ |
|   |   | $x^{(6)}(i) = d^{(1)}(4i + 3)$ |
| 8 | 2 | $x^{(0)}(i) = d^{(0)}(4i)$ $M_{symb}^{layer} = M_{symb}^{(0)}/4 = M_{symb}^{(1)}/4$ |
|   |   | $x^{(1)}(i) = d^{(0)}(4i + 1)$ |
|   |   | $x^{(2)}(i) = d^{(0)}(4i + 2)$ |
|   |   | $x^{(3)}(i) = d^{(0)}(4i + 3)$ |
|   |   | $x^{(4)}(i) = d^{(1)}(4i)$ |
|   |   | $x^{(5)}(i) = d^{(1)}(4i + 1)$ |
|   |   | $x^{(6)}(i) = d^{(1)}(4i + 2)$ |
|   |   | $x^{(7)}(i) = d^{(1)}(4i + 3)$ |

For demodulation purposes, a demodulation reference signal (DMRS), also referred to as a DMRS port may be transmitted along each data layer. The block of vectors $[x^{(0)}(i) \ldots x^{(v-1)}]^T$, $i=0, 1, \ldots, M_{symb}^{layer}-1$ can be mapped to DMRS antenna ports according to:

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix},$$

where $i=0, 1, \ldots, M_{symb}^{ap}-1$, $M_{symb}^{ap}=M_{symb}^{layer}$. The set of DMRS antenna ports $\{p_0, \ldots p_{v-1}\}$ and port-to-layer mapping may be dynamically indicated in DCI according to Tables 7.3.1.2.2-1/2/3/4 in 3GPP TS 38.212.

CSI Feedback

For CSI feedback, NR may use an implicit CSI mechanism where a WD feedback of the downlink channel state information includes typically a transmission rank indicator (RI), a precoder matrix indicator (PMI), and a channel quality indicator (CQI) for each codeword. The CQI/RI/PMI report can be either wideband, or subband based on configuration.

The RI may correspond to a recommended number of layers that are to be spatially multiplexed and thus transmitted in parallel over the effective channel; the PMI may identify a recommended precoding matrix to use; the CQI may represent a recommended modulation level (e.g., Quadrature Phase-Shift Keying (QPSK), 16 Quadrature Amplitude Modulation (16QAM), etc.) and coding rate for each codeword, or TB. NR supports transmission of one or two codewords to a WD in a slot where two codewords are used for 5 to 8 layer transmission and one codeword is used for 1 to 4 layer transmission. There is thus a relation between a CQI and an SINR of the spatial layers over which the codewords are transmitted and for two codewords there are two CQI values fed back.

Channel State Information Reference Signals (CSI-RS)

For CSI measurement and feedback, dedicated reference signals for CSI-RS may be defined. A CSI-RS resource may include between 1 and 32 CSI-RS ports and each port is typically transmitted on each transmit antenna (or virtual transmit antenna in case the port is precoded and mapped to multiple transmit antennas) and is used by a WD to measure the downlink channel between each of the transmit antenna ports and each of the WD's receive antenna ports. The antenna ports are also referred to as CSI-RS ports. The supported number of antenna ports in NR may be {1, 2, 4, 8, 12, 16, 24, 32}. By measuring the received CSI-RS, a WD can estimate the channel that the CSI-RS is traversing, including the radio propagation channel, potential precoding or beamforming, and antenna gains. The CSI-RS for the above purpose may also be referred to as Non-Zero Power (NZP) CSI-RS. However, there is also zero power (ZP) CSI-RS that may be used for other purposes than coherent channel measurements.

CSI-RS can be configured to be transmitted in certain REs in a slot and/or certain slots. FIG. 5 shows an example of a CSI-RS resource mapped to REs for 12 antenna ports, where 1 RE per RB per port is shown.

In addition, interference measurement resource for CSI feedback (CSI-IM) is also defined in NR for a WD to measure interference. A CSI-IM resource may include 4 REs, such as, for example, 4 adjacent REs in frequency in the same OFDM symbol, or 2-by-2 adjacent REs in both time and frequency in a slot. By measuring both the channel based on NZP CSI-RS and the interference based on CSI-IM, a WD can estimate the effective channel and noise plus interference to determine the CSI, i.e., the rank, the precoding matrix, and the channel quality.

Furthermore, a WD in NR may be configured to measure interference based on one or multiple NZP CSI-RS resources.

CSI Framework in NR

In NR, a WD can be configured with multiple CSI reporting settings (e.g., with higher layer parameter CSI-ReportConfig) and multiple CSI resource settings (e.g., with higher layer parameter CSI-ResourceConfig). Each CSI resource setting may have an associated identifier (e.g., higher layer parameter CSI-ResourceConfigId) and may include a list of S≥1 CSI Resource Sets (e.g., given by higher layer parameter csi-RS-ResourceSetList), where the list is comprised of references to NZP CSI-RS resource set(s), or the list is comprised of references to CSI-IM resource set(s). For periodic and semi-persistent CSI Resource Settings, the number of CSI Resource Sets configured may be limited to S=1.

For aperiodic CSI reporting, a list of CSI trigger states may be configured using the higher layer parameter CSI-AperiodicTriggerStateList. Each trigger state includes at least one CSI report setting. For aperiodic CSI Resource Setting with S>1 CSI resource sets, only one of the aperiodic CSI resource sets is associated with a CSI trigger state, and the WD is higher layer configured per trigger state per Resource Setting to select the one CSI-IM or NZP CSI-RS resource set from the Resource Setting. DCI may be used to select a CSI trigger state dynamically.

An example of the CSI-ReportConfig parameter or information element (IE) is shown below according to 3GPP TS 38.331 v15.3.0:

CSI-ReportConfig information element

```
-- ASN1START
-- TAG-CSI-REPORTCONFIG-START
CSI-ReportConfig ::=            SEQUENCE {
    reportConfigId                      CSI-ReportConfigId,
    carrier                 ServCellIndex                               OPTIONAL, -- Need S
    resourcesForChannelMeasurement                      CSI-ResourceConfigId,
    csi-IM-ResourcesForInterference                     CSI-ResourceConfigId
OPTIONAL, -- Need R
    nzp-CSI-RS-ResourcesForInterference                 CSI-ResourceConfigId
OPTIONAL, -- Need R
    reportConfigType                    CHOICE {
        periodic                SEQUENCE{
            reportSlotConfig                CSI-ReportPeriodicityAndOffset,
            pucch-CSI-ResourceList                  SEQUENCE (SIZE (1..maxNrofBWPs))
```

| CSI-ReportConfig information element |
|---|
| ```
OF PUCCH-CSI-Resource
        },
        semiPersistentOnPUCCH                 SEQUENCE {
            reportSlotConfig                  CSI-ReportPeriodicityAndOffset,
            pucch-CSI-ResourceList                SEQUENCE (SIZE (1..maxNrofBWPs))
OF PUCCH-CSI-Resource
        },
        semiPersistentOnPUSCH                 SEQUENCE {
            reportSlotConfig                  ENUMERATED {sl5, sl10, sl20, sl40, sl80,
sl160, sl320},
            reportSlotOffsetList              SEQUENCE (SIZE (1..maxNrofUL-
Allocations)) OF INTEGER(0..32),
            p0alpha                  P0-PUSCH-AlphaSetId
        },
        aperiodic                SEQUENCE {
            reportSlotOffsetList              SEQUENCE (SIZE (1..maxNrofUL-
Allocations)) OF INTEGER(0..32)
        }
    },
    reportQuantity                   CHOICE {
        none                 NULL,
        cri-RI-PMI-CQI                        NULL,
        cri-RI-i1            NULL,
        cri-RI-i1-CQI                SEQUENCE {
            pdsch-BundleSizeForCSI                    ENUMERATED {n2, n4}     OPTIONAL
-- Need S
        },
        cri-RI-CQI               NULL,
        cri-RSRP             NULL,
        ssb-Index-RSRP                   NULL,
        cri-RI-LI-PMI-CQI                     NULL
    },
    reportFreqConfiguration              SEQUENCE {
        cqi-FormatIndicator                   ENUMERATED { widebandCQI, subbandCQI
}       OPTIONAL,                         -- Need R
        pmi-FormatIndicator                   ENUMERATED { widebandPMI,
subbandPMI }                 OPTIONAL,                -- Need R
        csi-ReportingBand                CHOICE {
            subbands3                BIT STRING(SIZE(3)),
            subbands4                BIT STRING(SIZE(4)),
            subbands5                BIT STRING(SIZE(5)),
            subbands6                BIT STRING(SIZE(6)),
            subbands7                BIT STRING(SIZE(7)),
            subbands8                BIT STRING(SIZE(8)),
            subbands9                BIT STRING(SIZE(9)),
            subbands10                   BIT STRING(SIZE(10)),
            subbands11                   BIT STRING(SIZE(11)),
            subbands12                   BIT STRING(SIZE(12)),
            subbands13                   BIT STRING(SIZE(13)),
            subbands14                   BIT STRING(SIZE(14)),
            subbands15                   BIT STRING(SIZE(15)),
            subbands16                   BIT STRING(SIZE(16)),
            subbands17                   BIT STRING(SIZE(17)),
            subbands18                   BIT STRING(SIZE(18)),
            ...,
            subbands19-v1530                 BIT STRING(SIZE(19))
        } OPTIONAL -- Need S
    }
OPTIONAL,   -- Need R
    timeRestrictionForChannelMeasurements                     ENUMERATED {configured,
notConfigured},
    timeRestrictionForInterferenceMeasurements                    ENUMERATED {configured,
notConfigured},
    codebookConfig
OPTIONAL,   -- Need R
    nrofCQIsPerReport                    ENUMERATED {n1, n2}
OPTIONAL,   -- Need R
    groupBasedBeamReporting                   CHOICE {
        enabled              NULL,
        disabled             SEQUENCE {
            nrofReportedRS                   ENUMERATED {n1, n2, n3, n4}
OPTIONAL    -- Need S
        }
    },
    cqi-Table            ENUMERATED {table1, table2, table3, spare1}
``` |

| CSI-ReportConfig information element |
|---|
| ```
OPTIONAL,  -- Need R
    subbandSize                         ENUMERATED {value1, value2},
    non-PMI-PortIndication              SEQUENCE (SIZE (1..maxNrofNZP-CSI-RS-
ResourcesPerConfig)) OF PortIndexFor8Ranks OPTIONAL, -- Need R
    ...,
    [[
    semiPersistentOnPUSCH-v1530         SEQUENCE {
        reportSlotConfig-v1530          ENUMERATED {sl4, sl8, sl16}
    }
OPTIONAL   -- Need R
    ]]
}
CSI-ReportPeriodicityAndOffset ::= CHOICE {
    slots4          INTEGER(0..3),
    slots5          INTEGER(0..4),
    slots8          INTEGER(0..7),
    slots10         INTEGER(0..9),
    slots16         INTEGER(0..15),
    slots20         INTEGER(0..19),
    slots40         INTEGER(0..39),
    slots80         INTEGER(0..79),
    slots160        INTEGER(0..159),
    slots320        INTEGER(0..319)
}
PUCCH-CSI-Resource ::=              SEQUENCE {
    uplinkBandwidthPartId           BWP-Id,
    pucch-Resource                  PUCCH-ResourceId
}
PortIndexFor8Ranks ::=      CHOICE {
    portIndex8          SEQUENCE{
rank1-8                 PortIndex8
OPTIONAL,  -- Need R
    rank2-8             SEQUENCE(SIZE(2)) OF PortIndex8
OPTIONAL,  -- Need R
    rank3-8             SEQUENCE(SIZE(3)) OF PortIndex8
OPTIONAL,  -- Need R
    rank4-8             SEQUENCE(SIZE(4)) OF PortIndex8
OPTIONAL,  -- Need R
    rank5-8             SEQUENCE(SIZE(5)) OF PortIndex8
OPTIONAL,  -- Need R
    rank6-8             SEQUENCE(SIZE(6)) OF PortIndex8
OPTIONAL,  -- Need R
    rank7-8             SEQUENCE(SIZE(7)) OF PortIndex8
OPTIONAL,  -- Need R
    rank8-8             SEQUENCE(SIZE(8)) OF PortIndex8
OPTIONAL   -- Need R
    },
    portIndex4          SEQUENCE{
        rank1-4         PortIndex4
OPTIONAL,  -- Need R
        rank2-4         SEQUENCE(SIZE(2)) OF PortIndex4
OPTIONAL,  -- Need R
        rank3-4         SEQUENCE(SIZE(3)) OF PortIndex4
OPTIONAL,  -- Need R
        rank4-4         SEQUENCE(SIZE(4)) OF PortIndex4
OPTIONAL   -- Need R
    },
    portIndex2          SEQUENCE{
        rank1-2         PortIndex2
OPTIONAL,  -- Need R
        rank2-2         SEQUENCE(SIZE(2)) OF PortIndex2
OPTIONAL   -- Need R
    },
    portIndex1          NULL
}
PortIndex8::=       INTEGER (0..7)
PortIndex4::=       INTEGER (0..3)
PortIndex2::=       INTEGER (0..1)
-- TAG-CSI-REPORTCONFIG-STOP
-- ASN1STOP
``` |

Each CSI reporting setting may include one or more of the following information:
- A CSI resource setting on NZP CSI-RS resources for channel measurement;
- A CSI resource setting for CSI-IM resources for interference measurement;
- Optionally, a CSI resource setting for NZP CSI-RS resources for interference measurement;
- Time-domain behavior for reporting, e.g., periodic, semi-persistent, or aperiodic reporting;
- Frequency granularity, e.g., wideband or subband CQI and PMI respectively;
- Report quantity, e.g., CSI parameters to be reported such as RI, PMI, CQI, layer indicator (LI) and CSI-RS resource indicator (CRI) in case of multiple NZP CSI-RS resources in a resource set;
- Codebook types, e.g., type I or II if reported, and codebook subset restriction; and
- Measurement restriction.

When $K_s>1$ NZP CSI-RS resources are configured in the corresponding NZP CSI-RS resource set for channel measurement, one of the $K_s>1$ NZP CSI-RS resources may be selected by the WD and a NZP CSI-RS resource indicator (CRI) may be reported by the WD to indicate to the network node (e.g., gNB) about the selected NZP CSI-RS resource in the resource set. The WD may derive the other CSI parameters (i.e., RI, PMI and CQI) conditioned on the reported CRI, where CRI k (k≥0) corresponds to the configured (k+1)-th entry of associated NZP CSI-RS Resource in the corresponding NZP CSI-RS ResourceSet for channel measurement, and (k+1)-th entry of associated CSI-IM Resource in the corresponding CSI-IM-ResourceSet for interference measurement. The CSI-IM-ResourceSet, if configured, has also $K_s>1$ resources.

For aperiodic CSI reporting in NR, more than one CSI reporting setting with different NZP CSI-RS resource settings for channel measurement and/or CSI-IM resource settings for interference measurement can be configured within a single CSI trigger state and triggered at the same time with a DCI. In this case, multiple CSI reports, each associated with one CSI report setting, may be aggregated and sent from the WD to the network node (e.g., gNB) in a single physical uplink shared channel (PUSCH). Each CSI trigger state can include up to 16 CSI reporting settings in NR. A 3-bit CSI request field in an uplink DCI (i.e., DCI format 0-1) may be used to select one of the trigger states for CSI reporting. When the number of radio resource control (RRC) configured CSI trigger states are more than 7, medium access control (MAC) control element (CE) may be used to select 7 active trigger states out of the RRC configured trigger states.

Data Transmission Over Multiple Transmission Points or Panels

Dynamic Point Selection (DPS)

In 3GPP NR Release 15 (Rel-15), dynamic transmission point selection (DPS) can be supported in which a single transmission point (TRP), can be dynamically selected for transmitting data to a WD. A different TRP may be selected at different times. In this case, the network node (e.g., gNB) may request the WD to measure and feed back downlink (DL) CSI for each TRP individually and the network node (e.g., gNB) can compare the measurement feedback reports and then decides which TRP to use for data transmission to the WD. Since the TRPs may be in different physical locations, the propagation channels to the WD can also be different. Different antenna transmit beams may be used in the TRPs and so are different receive beams at the WD. To facilitate receiving physical downlink shared channel (PDSCH) data from different TRPs or different beams within the same or different TRP, transmission configuration indicator (TCI) states were introduced in 3GPP NR Rel-15.

A TCI state may include Quasi Co-location (QCL) information between the DMRS for PDSCH and one or two DL reference signals such as CSI-RS, or synchronization signal block (SSB). The supported QCL information types in NR may include:
- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

To support synchronization and channel tracking for DPS, a WD may be configured with multiple TCI states (e.g., one per TRP) and one of them may be selected and indicated in the DCI. The QCL information is used by a WD to apply one or more channel properties estimated from and associated with the DL reference signals (CSI-RS or SSB) to the DMRS-based channel estimation for the PDSCH reception. For example, the channel is first estimated based on CSI-RS and the channel delay spread and Doppler shift parameters are estimated from the source reference signal (RS), e.g., the CSI-RS in this case, i.e., channel analysis is performed. Typically, the source RS indicated by the TCI state is a periodic RS that the WD can continuously track the channel on and perform channel analysis. This information is then subsequently used for determining channel filtering parameters during PDSCH reception based on DMRS.

To support CSI feedback for DPS, a WD may be configured with multiple CSI reporting settings, one for each TRP. In each CSI reporting setting, a single NZP CSI-RS resource is contained in the CSI resource setting for channel measurement and a single CSI-IM resource is contained in the CSI resource setting for interference measurement. These multiple CSI reporting settings can be contained in a single aperiodic CSI triggering state. For example, with two TRPs the following may be configured for a WD:

CSI report setting #1:
   NZP CSI-RS resources for channel measurement: {NZP CSI-RS resource #1}
   CSI-IM resources for interference measurement: {CSI-IM resource #1}
CSI report setting #2:
   NZP CSI-RS resources for channel measurement: {NZP CSI-RS resource #2}
   CSI-IM resources for interference measurement: {CSI-IM resource #2}
Aperiodic CSI trigger state #k (k=3)
   {CSI report setting #1, CSI report setting #2}

In this case, a DCI with CSI bit field set to "100" may be sent to the WD to select CSI trigger state k=3 (note that, CSI bit field "000" may mean "no trigger", and "001" selects trigger state k=0, "010" selects state k=1, "011" selects state k=2, and so on). After receiving the DCI, the WD can measure and report CSI for both TRPs at once in a physical uplink shared channel (PUSCH), e.g., {CSI for TRP #1, CSI for TRP #2}.

Non-Coherent Joint Transmission (NC-JT)

NC-JT refers to MIMO data transmission over multiple TRPs in which different MIMO layers are transmitted over different TRPs. An example is shown in FIG. 6, where a PDSCH is sent to a WD over two TRPs, each TRP carrying one code word (CW). For example, when the WD has 4 receive antennas while each of the TRPs has only 2 transmit antennas, the WD can support up to 4 MIMO layers but each TRP can maximally transmit 2 MIMO layers. In this case, by transmitting data over two TRPs to the WD, the peak data rate to the WD can be increased because up to 4 aggregated layers from the two TRPs can be used. This can be beneficial when the traffic load and thus the resource utilization, is low in each TRP. The scheme can also be beneficial in the case where the WD is in line of sight (LOS) of both the TRPs and the rank per TRP is limited even when there are more transmit antennas available at each TRP.

This type of NC-JT is supported in LTE with two TRPs. For CSI feedback purposes, a WD may be configured with a CSI process with two NZP CSI-RS resources, one for each TRP, and one interference measurement resource. For WD complexity reasons, a limitation on at most 8 CSI-RS ports per CSI-RS resource was introduced for this feedback mode (however, each TRP may have more than 8 transmission chains, in which case the transmission chains may be virtualized down to 8 ports). The WD calculates CSI per NZP CSI-RS resource and reports a pair of RIs, (RI1, RI2), a pair of PMIs, (PMI1, PMI2), and a pair of CQIs, (CQI1, CQI2), by considering the mutual interference between the two code words (CWs) from the two TRPs. With two CWs, either scheduled using a single or two PDSCHs (although only single PDSCH is supported in LTE), different modulation coding schemes (MCSs) can be used for the two TRPs. An advanced receiver with CW-level interference cancellation (CWIC) can be used at the WD. Furthermore, when one CW is received with error, only that CW may be re-transmitted. Here, the maximum number of TRPs that can be supported in a NC-JT using single PDSCH may be two, because only two CWs are supported within a single PDSCH in LTE and NR.

Only DPS-based multi-TRP transmission is currently supported in NR. There is currently no NC-JT CSI feedback specified in NR.

SUMMARY

Some embodiments advantageously provide methods and apparatuses for CSI feedback that allows for dynamic switching between single TRP transmission and NC-JT or URLLC with a low CSI feedback overhead (as compared to existing CSI feedback techniques).

In one embodiment, a method implemented in a network node is provided. The method includes one or more of:
  sending downlink channel transmissions from a single transmission point (TRP) and/or multiple transmission points (multi-trp)
  configuring the WD with one channel state information (CSI) report setting with K>1 non-zero power channel state information reference signal (NZP CSI-RS) resources, each associated with one TRP;
  requesting a CSI feedback report from the WD assuming data transmission from each one of the K TRPs and data transmission from each of M>1 TRPs of the K TRPs based on the CSI report setting; and/or
  scheduling the downlink channel transmissions to the WD based on the CSI feedback report.

In another embodiment, a method implemented in a wireless device (WD) is provided. The method includes one or more of:
  receiving a CSI feedback request based on a channel state information (CSI) report setting for K>1 non-zero power channel state information reference signal (NZP CSI-RS) resources, each associated with one transmission point (TRP); and/or
  measuring and sending a channel state information (CSI) feedback report assuming data transmission from each one of the K TRPs and data transmission from each of M>1 TRPs of the K TRPs based on the received CSI report setting.

According to one aspect of the present disclosure, a method implemented in a wireless device is provided. The method includes receiving a configuration of a channel state information, CSI, report setting for at least K>1 non-zero power channel state information reference signal, NZP CSI-RS, resources for channel measurement and a report quantity configuration, K being an integer. The method includes receiving a CSI feedback report request for CSI measurement and feedback based at least in part on the CSI report setting. The method includes measuring channels based at least in part on the NZP CSI-RS resources. The method includes sending a channel state information, CSI, feedback report based at least in part on: the channel measurements; and the report quantity configuration. The CSI feedback report includes at least one of a first CSI feedback and a second CSI feedback.

In some embodiments of this aspect, the first CSI feedback comprises one CSI associated with each of the K NZP CSI-RS resources. In some embodiments of this aspect, the second CSI feedback comprises a CSI for one of non-coherent joint, NC-JT, transmission and Ultra Reliable Low Latency, URLL, transmission. In some embodiments of this aspect, the second CSI feedback includes a first rank indicator and a first precoding matrix indicator associated with a first NZP CSI-RS resource, and a second rank indicator and a second precoding matrix indicator associated with a second NZP CSI-RS resource, and a joint channel quality indicator conditioned on the first and the second rank and precoding matrix indicators. In some embodiments of this aspect, the second CSI feedback comprises a first rank indicator and a first layer indicator associated with a first NZP CSI-RS resource, and a second rank indicator and a second layer indicator associated with a second NZP CSI-RS resource, and a joint channel quality indicator conditioned on the first and the second rank and layer indicators. In some embodiments of this aspect, the second CSI feedback further includes identities of the first and the second NZP CSI-RS resources.

In some embodiments of this aspect, the method further includes determining whether to include the second CSI feedback in the CSI feedback report. In some embodiments of this aspect, determining whether to include the second CSI feedback further includes determining to include the second CSI feedback if each rank of the first CSI feedback is below a threshold value. In some embodiments of this aspect, the CSI feedback report further comprises an indicator indicating whether the second CSI feedback is present in the CSI feedback report. In some embodiments of this aspect, the CSI feedback report includes only the second CSI feedback.

According to another aspect of the present disclosure, a method implemented in a network node is provided. The method includes configuring a wireless device with a channel state information, CSI, report setting for at least K>1 non-zero power channel state information reference signal, NZP CSI-RS, resources for channel measurement and a report quantity configuration, K being an integer. The method includes sending a CSI feedback report request for CSI measurement and feedback based at least in part on the CSI report setting. The method includes receiving a channel state information, CSI, feedback report, the CSI feedback report based at least in part on the CSI report setting. The method includes the CSI feedback report comprising at least one of a first CSI feedback and a second CSI feedback.

In some embodiments of this aspect, the first CSI feedback comprises one CSI associated with each of the K NZP CSI-RS resources. In some embodiments of this aspect, the second CSI feedback comprises a CSI for one of non-coherent joint, NC-JT, transmission and Ultra Reliable Low Latency, URLL, transmission. In some embodiments of this aspect, the second CSI feedback comprises a first rank indicator and a first precoding matrix indicator associated with a first NZP CSI-RS resource and a second rank indicator and a second precoding matrix indicator associated with a second NZP CSI-RS resource, and a joint channel quality indicator conditioned on the first and the second rank and precoding matrix indicators. In some embodiments of this aspect, the second CSI feedback comprises a first rank indicator and a first layer indicator associated with a first NZP CSI-RS resource, and a second rank indicator and a second layer indicator associated with a second NZP CSI-RS resource, and a joint channel quality indicator conditioned on the first and the second rank and layer indicators.

In some embodiments of this aspect, the second CSI feedback further comprises identities of the first and the second NZP CSI-RS resources. In some embodiments of this aspect, the CSI feedback report includes both of the first CSI feedback and the second CSI feedback. In some embodiments of this aspect, the CSI feedback report includes the second CSI feedback if each rank of the first CSI feedback is below a threshold value. In some embodiments of this aspect, the CSI feedback report further comprises an indicator indicating whether or not the second CSI feedback is present in the CSI feedback report. In some embodiments of this aspect, the CSI feedback report includes only the second CSI feedback.

According to yet another aspect of the present disclosure, a wireless device configured to communicate with a network node is provided. The wireless device includes processing circuitry configured to cause the wireless device to receive a configuration of a channel state information, CSI, report setting for at least K>1 non-zero power channel state information reference signal, NZP CSI-RS, resources for channel measurement and a report quantity configuration, K being an integer. The processing circuitry is configured to cause the wireless device to receive a CSI feedback report request for CSI measurement and feedback based at least in part on the CSI report setting. The processing circuitry is configured to cause the wireless device to measure channels based at least in part on the NZP CSI-RS resources. The processing circuitry is configured to cause the wireless device to send a channel state information, CSI, feedback report based at least in part on: the channel measurements; and the report quantity configuration. The CSI feedback report includes at least one of a first CSI feedback and a second CSI feedback.

In some embodiments of this aspect, the first CSI feedback includes one CSI for each of the K NZP CSI-RS resources. In some embodiments of this aspect, the second CSI feedback includes a CSI for one of non-coherent joint, NC-JT, transmission and Ultra Reliable Low Latency, URLL, transmission. In some embodiments of this aspect, the second CSI feedback includes a first rank indicator and a first precoding matrix indicator associated with a first NZP CSI-RS resource and a second rank indicator and a second precoding matrix indicator associated with a second NZP CSI-RS resource, and a joint channel quality indicator conditioned on the first and the second rank and precoding matrix indicators. In some embodiments of this aspect, the second CSI feedback includes a first rank indicator and a first layer indicator associated with a first NZP CSI-RS resource, and a second rank indicator and a second layer indicator associated with a second NZP CSI-RS resource, and a joint channel quality indicator conditioned on the first and the second rank and layer indicators.

In some embodiments of this aspect, the second CSI feedback further includes identities of the first and the second NZP CSI-RS resources. In some embodiments of this aspect, the processing circuitry is further configured to cause the wireless device to determine whether to include the second CSI feedback in the CSI feedback report. In some embodiments of this aspect, the processing circuitry is further configured to cause the wireless device to determine whether to include the second CSI feedback by being configured to cause the wireless device to determine to include the second CSI feedback if each rank of the first CSI feedback is below a threshold value. In some embodiments of this aspect, the CSI feedback report further includes an indicator indicating whether the second CSI feedback is present in the CSI feedback report. In some embodiments of this aspect, the CSI feedback report includes only the second CSI feedback.

According to another aspect of the present disclosure, a network node configured to communicate with a wireless device is provided. The network node includes processing circuitry. The processing circuitry is configured to cause the network node to configure the wireless device with a channel state information, CSI, report setting for at least K>1 non-zero power channel state information reference signal, NZP CSI-RS, resources for channel measurement and a report quantity configuration, K being an integer. The processing circuitry is configured to cause to network node to send a CSI feedback report request for CSI measurement and feedback based at least in part on the CSI report setting. The processing circuitry is configured to cause to network node to receive a channel state information, CSI, feedback report, the CSI feedback report based at least in part on the CSI report setting and the CSI feedback report including at least one of a first CSI feedback and a second CSI feedback.

In some embodiments of this aspect, the first CSI feedback includes one CSI for each of the K NZP CSI-RS resources. In some embodiments of this aspect, the second CSI feedback includes a CSI for one of non-coherent joint, NC-JT, transmission and Ultra Reliable Low Latency, URLL, transmission. In some embodiments of this aspect, the second CSI feedback comprises a first rank indicator and a first precoding matrix indicator associated with a first NZP CSI-RS resource and a second rank indicator and a second precoding matrix indicator associated with a second NZP CSI-RS resource, and a joint channel quality indicator conditioned on the first and the second rank and precoding matrix indicators.

In some embodiments of this aspect, the second CSI feedback comprises a first rank indicator and a first layer indicator associated with a first NZP CSI-RS resource, and a second rank indicator and a second layer indicator associated with a second NZP CSI-RS resource, and a joint channel quality indicator conditioned on the first and the second rank and layer indicators. In some embodiments of this aspect, the second CSI feedback further includes identities of the first and the second NZP CSI-RS resources. In some embodiments of this aspect, the CSI feedback report includes both of the first CSI feedback and the second CSI feedback. In some embodiments of this aspect, the CSI feedback report includes the second CSI feedback if each rank of the first CSI feedback is below a threshold value. In some embodiments of this aspect, the CSI feedback report further includes an indicator indicating whether or not the second CSI feedback is present in the CSI feedback report. In some embodiments of this aspect, the CSI feedback report includes only the second CSI feedback.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 11 is a flowchart illustrating exemplary methods implemented in a communication system including a host computer, a network node and a wireless device for executing a client application at a wireless device according to some embodiments of the present disclosure;

FIG. 12 is a flowchart illustrating exemplary methods implemented in a communication system including a host computer, a network node and a wireless device for receiving user data at a wireless device according to some embodiments of the present disclosure;

DETAILED DESCRIPTION

Figure 1:
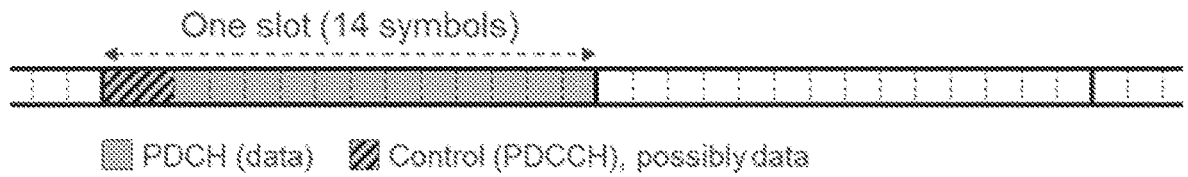
FIG. 1 illustrates an example of an NR time-domain structure with 15 kHz subcarrier spacing.
Figure 2:
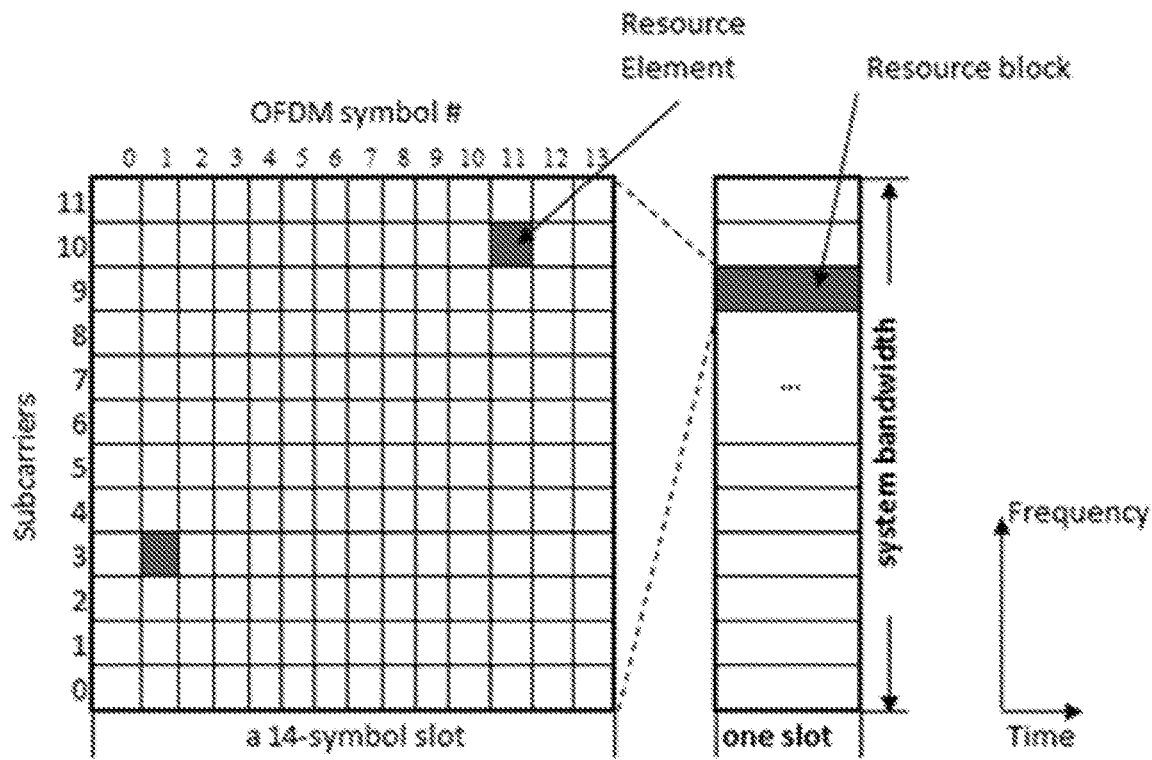
FIG. 2 illustrates an example of an NR physical resource grid.
Figure 3:
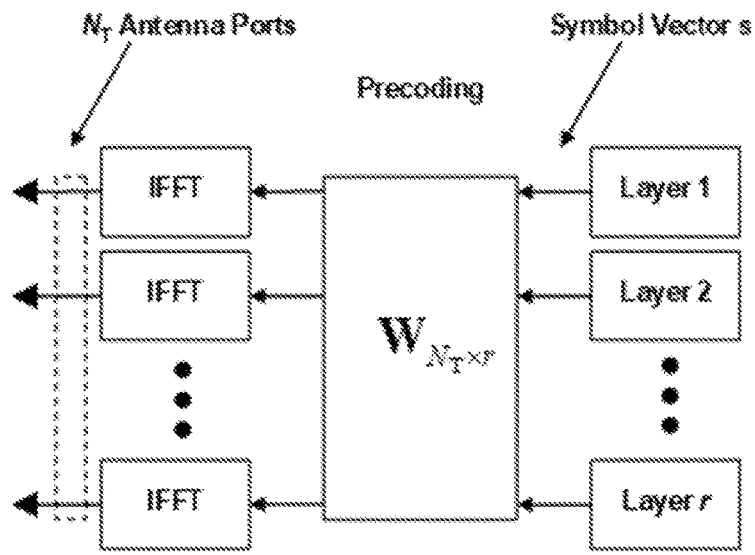
FIG. 3 illustrates an example of a transmission structure of precoded spatial multiplexing mode in LTE.
Figure 4:
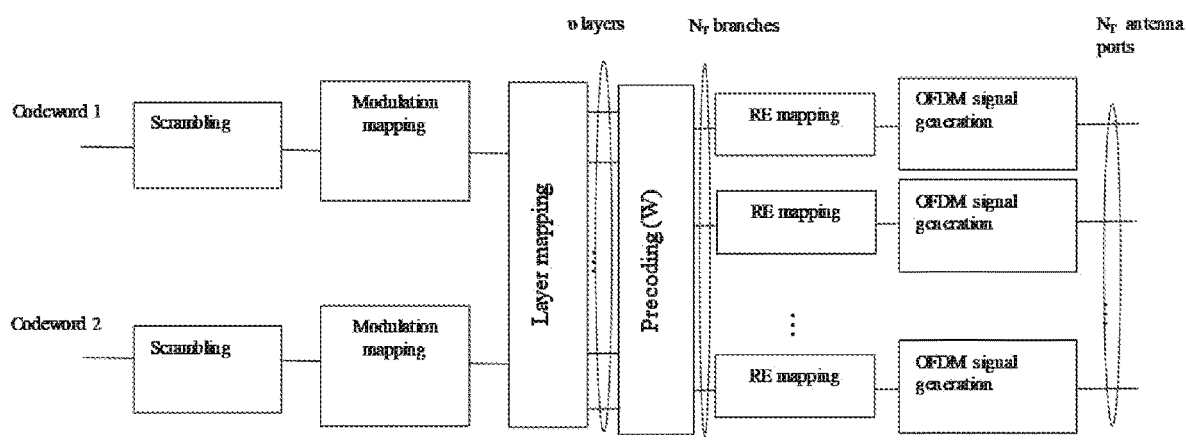
FIG. 4 illustrates an example of an NR MIMO data transmission over multiple antennas.
Figure 5:
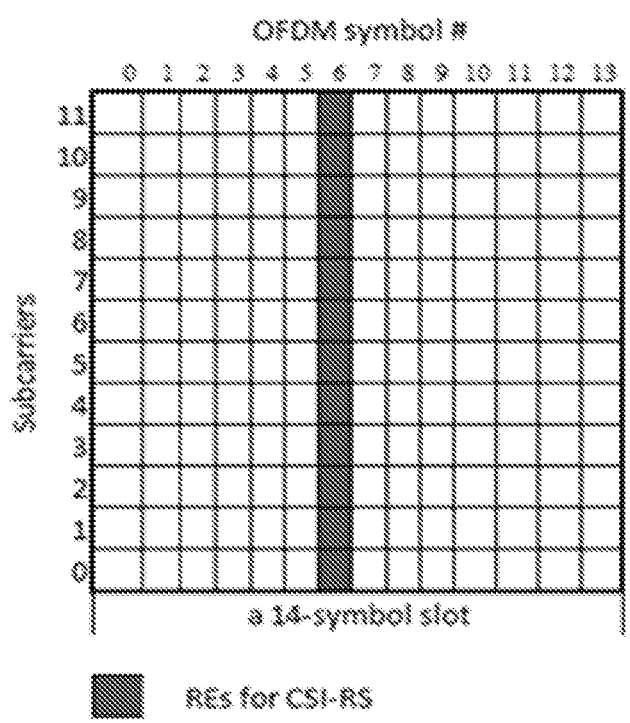
FIG. 5 illustrates an example of RE allocation for a 12-port CSI-RS resource in NR.
Figure 6:
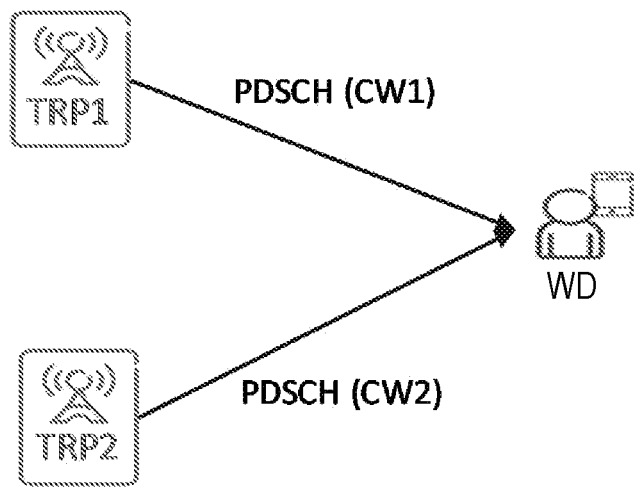
FIG. 6 illustrates an example of NC-JT.
Figure 7:
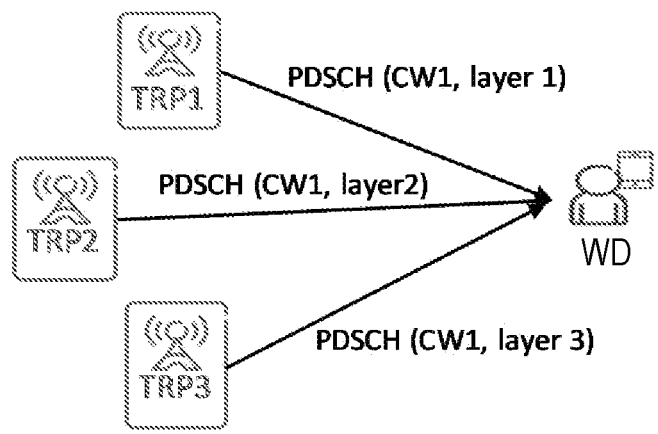
FIG. 7 illustrates an example of transmitting a single CW over multiple TRPs.

An alternative approach to NC-JT is to use a single PDSCH and a single CW over multiple TRPs, an example is shown in FIG. 7, where different layers are transmitted from three TRPs. This allows data transmission over more than 2 TRPs.

In one scenario, a network node (e.g., gNB) may configure a WD with multiple CSI reporting settings, some for DPS and the other for NC-JT. The WD then feeds back two CSI reports, one for dynamic point selection (DPS) and the other for NC-JT. The network node (e.g., gNB) can decide whether to use DPS or NC-JT based on the CSI reports as well as other information available at the network node (e.g., gNB). In another scenario, the network node (e.g., gNB) may configure a WD with N>1 NZP CSI-RS resources, each associated with one TRP, in a CSI resource setting as part of a CSI reporting setting for channel measurement. The WD may be allowed to select m=(1, 2, . . . , N) preferred NZP CSI-RS resources. In this case, the WD would feedback a single CSI report including at least an indicator of "Number of Selected Resources", i.e., NSRI, which indicates how many resources are selected along with a set of the selected CSI-RS resource indicators (CRIs), i.e., $\{CRI_1, \ldots, CRI_{NRI}\}$. NSRI=1 may mean that only a single TRP is selected, i.e., DPS transmission is preferred, while NRI>1 may indicate that NC-JT transmission is preferred.

Multi-TRP Transmission for Ultra-Reliable Low Latency Communication (URLLC)

Figure 8:
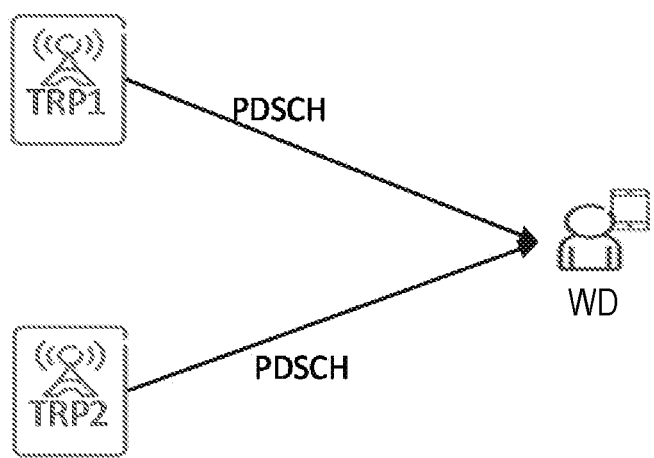
FIG. 8 illustrates an example of data transmission over multiple TRPs for increased reliability.

In addition to using multi-TRP transmission for improved data throughput and increased spectral efficiency, another application of multi-TRP transmission is to provide increased reliability for data transmission, in a kind of "TRP diversity," which can be useful particularly in some mission critical applications such as auto driving, industrial control and factory automation. In these applications, the critical requirements are on reliability (e.g., low block error rate (BLER)) and/or latency. In this case, a same data packet may be transmitted over multiple TRPs as shown FIG. 8, as an example, where the two PDSCHs carry the same encoded data payload but with the same or different redundancy versions (RVs) so that the WD can perform soft combining of data received from the two PDSCHs.

Either the same or different time/frequency resources may be used for the transmitted PDSCH in different TRPs. When the same time and frequency resource is used in different TRPs, different MIMO layers are used for the PDSCHs transmitted from different TRPs and a MIMO receiver at the WD should be capable of separating the MIMO layers for PDSCH decoding. In this case, each layer/PDSCH may use reference signals that are orthogonal to reference signals used by other transmitted layers/PDSCH in the same resource. In another scenario, different time and frequency resources may be used in different TRPs. The codeword carried by the PDSCHs from different TRPs may have the same or different RV and soft combining is performed at the WD. Chase combining (CC) can be performed when the same RV is used, while Incremental redundancy (IR)-based soft combining can be performed when different RVs are used.

In another scenario, the same PDSCH may simply be repeated over multiple TRPs in the same resource and with the same DMRS port and the same RV and the composite signal is received by the WD in a single frequency network (SFN) fashion. Hence, in this case, the multiple TRPs are "hidden" from the WD's perspective since the WD only observes a single layer. This typically works in small deployments such as indoor, and at low to medium carrier frequencies. Only DPS-based multi-TRP transmission is currently supported in NR, hence there is no NC-JT CSI feedback specified. Although LTE-like CSI feedback for NC-JT could in theory be used in NR, there are some limitations. To support dynamic switching between single TRP transmission and NC-JT transmission over multiple TRPs, multiple CSI report settings may be configured for a WD. Unfortunately, the feedback overhead can be large, particularly when a large number of antenna ports are deployed per TRP. For example, if a WD is configured with three TRPs and data can be transmitted from any one of the TRPs to the WD in case of DPS, or from any two of the TRPs in case of NC-JT, then to support dynamic TRP selection and dynamic switching between DPS and NC-JT, the WD may need to be configured to measure and report the following CSIs:

CSI #1 for TRP #1, CSI #2 for TRP #2, CSI #3 for TRP #3, for DPS
Each CSI includes {RI, PMI, and CQI}
NC-JT CSI #4 for {TRP #1, TRP #2}, NC-JT CSI #5 for {TRP #1, TRP #3}, NC-JT CSI #6 for {TRP #2, TRP #3}
Each NC-JT CSI includes a pair of {RI, PMI, CQI}, one associated with each TRP in the corresponding TRP pair Compared to DPS, the CSI overhead for supporting dynamic switching between DPS and NC-JT would be increased almost three times compared to DPS only if the current NR or LTE CSI reporting approach is used.

CSI feedback for multi-TRP transmission for URLLC is not currently supported in NR by considering soft combining of multiple PDSCHs at the WD. Thus, there are problems with enabling dynamic switching between single TRP and URLLC transmission without significantly increasing the CSI feedback overhead.

Accordingly, some embodiments of this disclosure provide techniques for joint CSI feedback supporting the possibility to perform dynamic switching between single TRP transmission with DPS and NC-JT, which may include one or more of the following:

1. A single CSI report setting is configured for both single TRP transmission and NC-JT transmission hypotheses. For the case of three TRPs configured for the WD, the single TRP transmission hypothesis comprises three single TRP transmissions each from one of the three TRPs, and the NC JT transmission hypothesis comprises three NC-JT transmissions each from one pair of TRPs of the three TRPs.
2. Whether CSI for NC-JT is reported in the CSI report is determined by the WD and depends on some conditions. One such condition is related to the estimated ranks of each of the single TRP transmission hypotheses. When the rank of any TRP is greater than a configured threshold (e.g., 2), CSI for NC-JT transmission hypothesis is not reported.
   a. CSI for NC-JT transmission hypothesis is reported only when the rank of single TRP transmission hypothesis CSI for all TRPs is equal or below the threshold
   b. In another example, the condition may be related to the estimated WD throughputs with single and NC-JT transmissions. If the throughput with NC-JT is lower than that with single TRP transmission over any one of the pair of TRPs over which NC-JT transmission was assumed.
3. When NC-JT CSI is reported, no additional PMI per TRP is reported in the specific NC-JT CSI. When the rank of NC-JT transmission hypothesis CSI for a TRP is the same as the corresponding rank for single TRP transmission hypothesis CSI, the PMI for NC-JT transmission hypothesis is the same as that in single TRP transmission hypothesis CSI. When the rank of a TRP for NC-JT transmission hypothesis is smaller than that of the single TRP transmission hypothesis CSI, a subset of the layers of single TRP transmission hypothesis CSI are used for NC-JT transmission hypothesis and a layer indicator is reported as part of the NC-JT transmission hypothesis CSI referring to the single TRP transmission hypothesis CSI.
4. Two-parts CSI encoding is used: the first part has a fixed payload size and contains the ranks for single TRP transmission hypothesis CSI. The second part has a variable payload size and contains the remaining CSI.

For URLLC transmission requirements, joint CSI feedback supporting the possibility to perform dynamic switching between single TRP transmission and URLLC is also provided in some embodiments of this disclosure, which may include one or more of the following:

1. A single CSI report setting is configured for both single TRP transmission hypothesis feedback and URLLC CSI feedback.
2. Rank per TRP for URLLC CSI feedback may in one embodiment be restricted to 1 and thus rank is in this case not reported in CSI for URLLC.
3. No dedicated PMI per TRP is reported for URLLC CSI. Instead, one of the MIMO layers of single TRP CSI for each TRP is selected and reported by utilizing a layer indicator (LI) per TRP. The bit width for the layer indicator varies depending on the rank of the single TRP transmission hypothesis CSI. If single layer is selected, then no LI is fed back for this TRP.
4. Two-part CSI encoding may be used: the first part has a fixed payload size and contains the ranks for the single TRP CSI. The second part has a variable payload size and contains the remaining CSI including URLLC CSI.

Some embodiments provided in this disclosure advantageously introduce CSI feedback that allows the network node (e.g., gNB) to perform dynamic switching between single TRP transmission and NC-JT or URLLC with a low CSI feedback overhead (as compared to existing CSI feedback techniques).

Before describing in detail exemplary embodiments, it is noted that the embodiments reside primarily in combinations of apparatus components and processing steps related to low overhead CSI feedback for multi-trp transmission. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. In some embodiments, the network node may comprise one or more TRPs. In some embodiments, multiple TRPs may be comprised in a single network node or distributed over more than one network node. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

In some embodiments, a TRP may be associated with a network node. In some embodiments, a multi-trp may include more than one TRPs associated with one or more network nodes.

Although the description herein may be explained in the context of a downlink (DL) channel (e.g., PDSCH), it should be understood that the principles may also be applicable to other channels, such as, for example, other DL channels, or even some uplink channels (e.g., PUSCH).

Any two or more embodiments described in this disclosure may be combined in any way with each other.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 9:
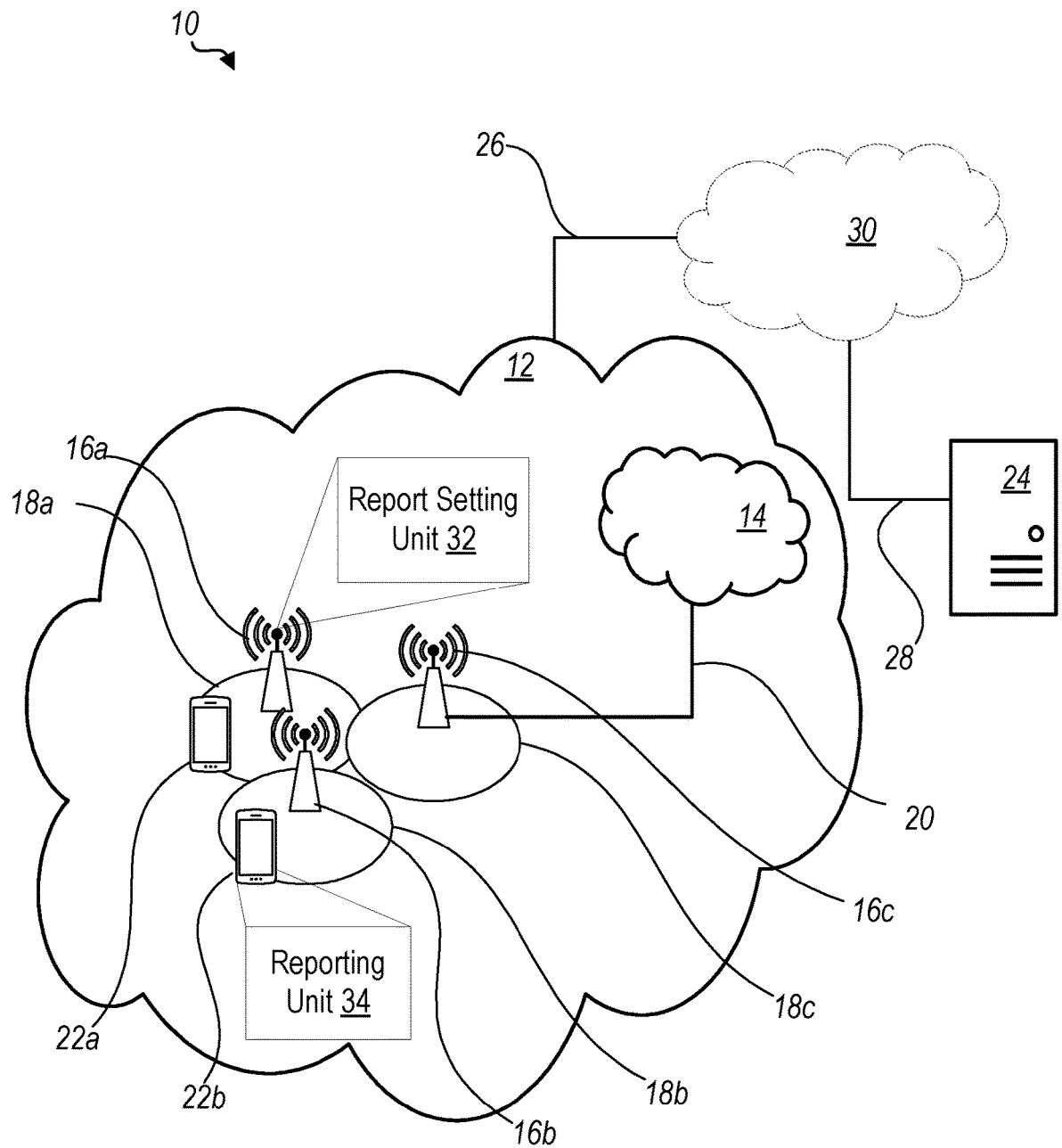
FIG. 9 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 9 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 9 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

In some embodiments, a network node 16 is configured to include a report setting unit 32 which is configured to:

configure the wireless device with a channel state information, CSI, report setting for at least K>1 non-zero power channel state information reference signal, NZP CSI-RS, resources for channel measurement and a report quantity configuration, K being an integer;

send a CSI feedback report request for CSI measurement and feedback based at least in part on the CSI report setting; and receive a channel state information, CSI, feedback report, the CSI feedback report based at least in part on the CSI report setting and the CSI feedback report comprising at least one of a first CSI feedback and a second CSI feedback.

In some embodiments, a network node 16 is configured to include a report setting unit 32 which is configured to one or more of:

send downlink channel transmissions from a single transmission point (TRP) and/or multiple transmission points (multi-trp);

configure the WD with one channel state information (CSI) report setting with K>1 non-zero power channel state information reference signal (NZP CSI-RS) resources, each associated with one TRP; and/or request a CSI feedback report from the WD based on the CSI report setting by assuming data transmission from each one of the K TRPs and data transmission from each of M>1 TRPs of the K TRPs; and/or schedule the downlink channel transmissions to the WD based on the CSI feedback report.

In some embodiments, a wireless device 22 is configured to include a reporting unit 34 which is configured to:

receive a configuration of a channel state information, CSI, report setting for at least K>1 non-zero power channel state information reference signal, NZP CSI-RS, resources for channel measurement and a report quantity configuration, K being an integer;

receive a CSI feedback report request for CSI measurement and feedback based at least in part on the CSI report setting;

measure channels based at least in part on the NZP CSI-RS resources; and send a channel state information, CSI, feedback report based at least in part on:

the channel measurements; and the report quantity configuration; and the CSI feedback report comprising at least one of a first CSI feedback and a second CSI feedback.

In some embodiments, a wireless device 22 is configured to include a reporting unit 34 which is configured to one or more of:

receive a CSI feedback request based on one channel state information (CSI) report setting with K>1 non-zero power channel state information reference signal (NZP CSI-RS) resources, each associated with one transmission point (TRP); and/or measure and feedback a channel state information (CSI) feedback report assuming data transmission from each one of the K TRPs and data transmission from each of M>1 TRPs of the K TRPs based on the received CSI report setting.

Example implementations, in accordance with an embodiment, of the WD 22, network node 16 and host computer 24 discussed in the preceding paragraphs will now be described with reference to FIG. 10. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16, such as the process described with reference to FIG. 15 and the other figures. For example, processing circuitry 68 of the network node 16 may include report setting unit 32 configured to one or more of:

send downlink channel transmissions from a single transmission point (TRP) and/or multiple transmission points (multi-trp);

configure the WD with one channel state information (CSI) report setting with K>1 non-zero power channel state information reference signal (NZP CSI-RS) resources, each associated with one TRP; and/or request a CSI feedback report from the WD based on the CSI report setting by assuming data transmission from each one of the K TRPs and data transmission from each of M>1 TRPs of the K TRPs; and/or schedule the downlink channel transmissions to the WD based on the CSI feedback report.

In some embodiments, the CSI feedback report comprises K single TRP CSIs each associated with one of the K NZP CSI-RS resources and if a certain condition is met, one or more CSIs for NC-JT transmission. In some embodiments, the CSI feedback report further comprises an indicator to indicate whether NC-JT CSI is present in the report.

In some embodiments, the CSI feedback report includes one of: both a single transmission point (TRP) hypothesis and a non-coherent joint transmission (NC-JT) transmission hypothesis; and one of the single TRP hypothesis and the non-coherent joint transmission (NC-JT) transmission hypothesis. In some embodiments, the CSI feedback report depends on certain conditions. In some embodiments, the CSI feedback report depends on a rank threshold. In some embodiments, the CSI feedback report includes a first part and a second part, a size of the first part being fixed and a size of the second part being dependent on the first part.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22, such as the process described with reference to FIG. 16 and the other figures. For example, the processing circuitry 84 of the wireless device 22 may include a reporting unit 34 configured to one or more of:

receive a CSI feedback request based on one channel state information (CSI) report setting with K>1 non-zero power channel state information reference signal (NZP CSI-RS) resources, each associated with one transmission point (TRP); and/or measure and feedback a channel state information (CSI) feedback report assuming data transmission from each one of the K TRPs and data transmission from each of M>1 TRPs of the K TRPs based on the received CSI report setting.

In some embodiments, the CSI feedback report comprises K single TRP CSIs each associated with one of the K NZP CSI-RS resources and if a certain condition is met, one or more CSIs for NC-JT. In some embodiments, the CSI feedback report further comprises an indicator to indicate whether NC-JT CSI is present in the CSI feedback report.

In some embodiments, the CSI feedback report depends on certain conditions. In some embodiments, the CSI feedback report depends on a rank threshold. In some embodiments, the CSI feedback report includes a first part and a second part, a size of the first part being fixed and a size of the second part being dependent on the first part.

Figure 10:
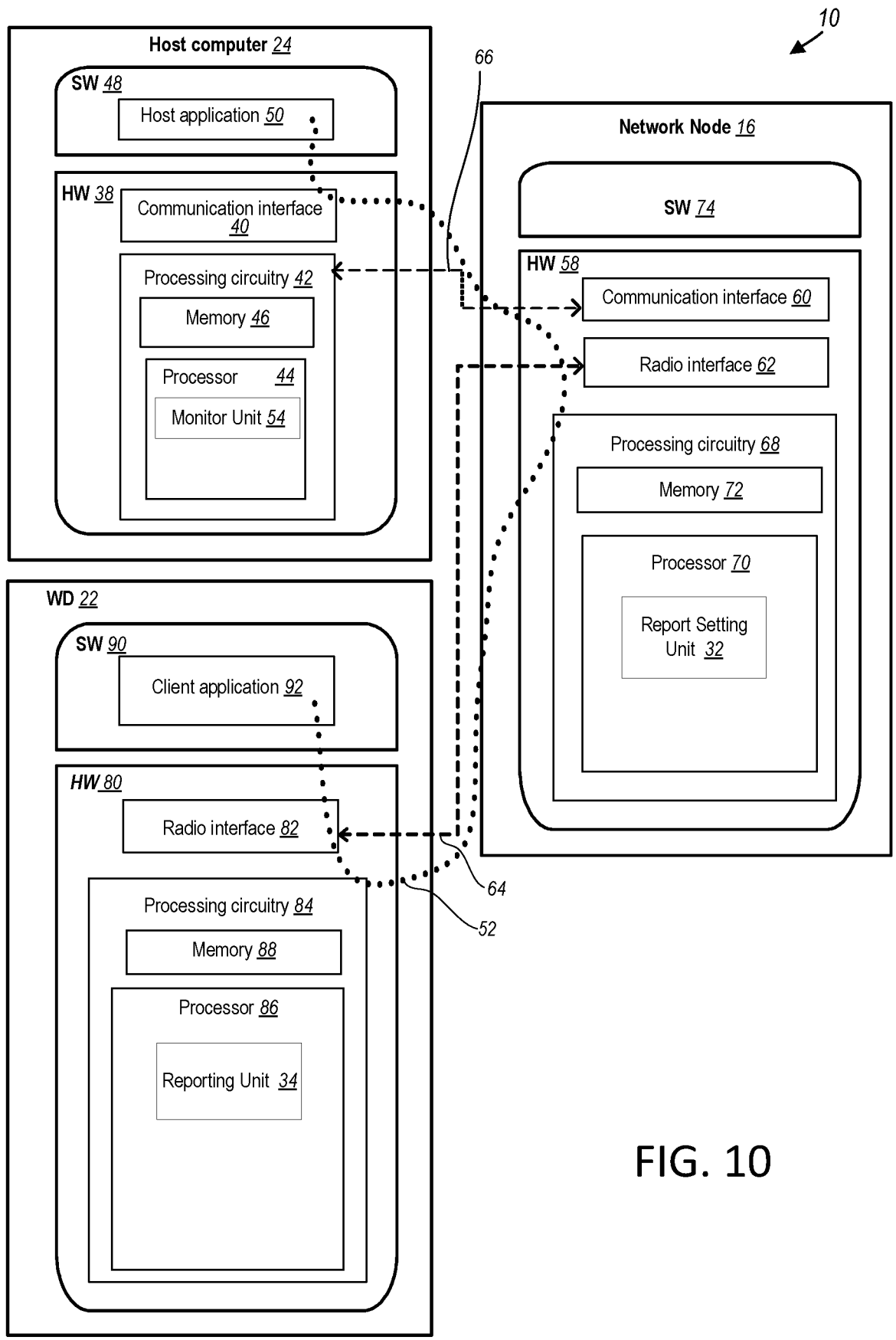
FIG. 10 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 10 and independently, the surrounding network topology may be that of FIG. 9.

In FIG. 10, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 9 and 10 show various "units" such as report setting unit 32, and reporting unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 11 is a flowchart illustrating an exemplary method implemented in a communication system, such as, for example, the communication system of FIGS. 9 and 10, in accordance with one embodiment. The communication system may include a host computer 24, a network node 16 and a WD 22, which may be those described with reference to FIG. 10. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 12 is a flowchart illustrating an exemplary method implemented in a communication system, such as, for example, the communication system of FIG. 9, in accordance with one embodiment. The communication system may include a host computer 24, a network node 16 and a WD 22, which may be those described with reference to FIGS. 9 and 10. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 13:
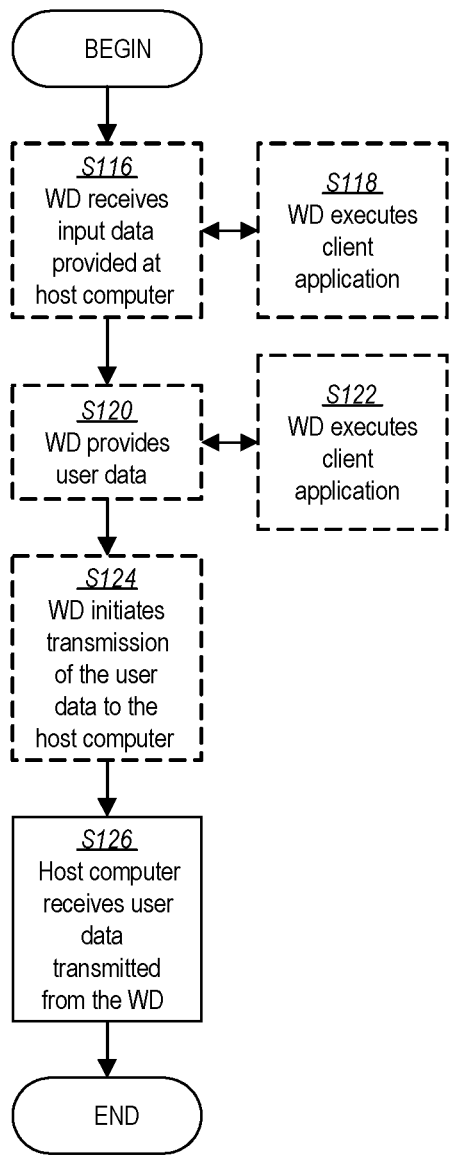
FIG. 13 is a flowchart illustrating exemplary methods implemented in a communication system including a host computer, a network node and a wireless device for receiving user data from the wireless device at a host computer according to some embodiments of the present disclosure.

FIG. 13 is a flowchart illustrating an exemplary method implemented in a communication system, such as, for example, the communication system of FIG. 9, in accordance with one embodiment. The communication system may include a host computer 24, a network node 16 and a WD 22, which may be those described with reference to FIGS. 9 and 10. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 14:
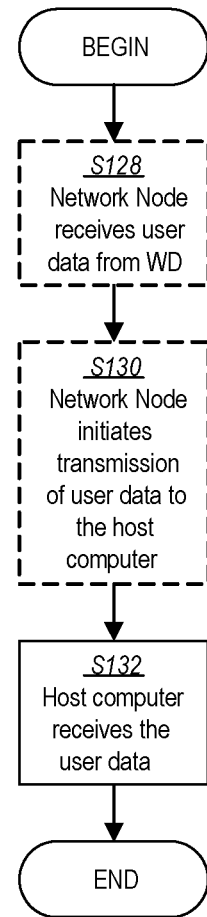
FIG. 14 is a flowchart illustrating exemplary methods implemented in a communication system including a host computer, a network node and a wireless device for receiving user data at a host computer according to some embodiments of the present disclosure.

FIG. 14 is a flowchart illustrating an exemplary method implemented in a communication system, such as, for example, the communication system of FIG. 9, in accordance with one embodiment. The communication system may include a host computer 24, a network node 16 and a WD 22, which may be those described with reference to FIGS. 9 and 10. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 15:
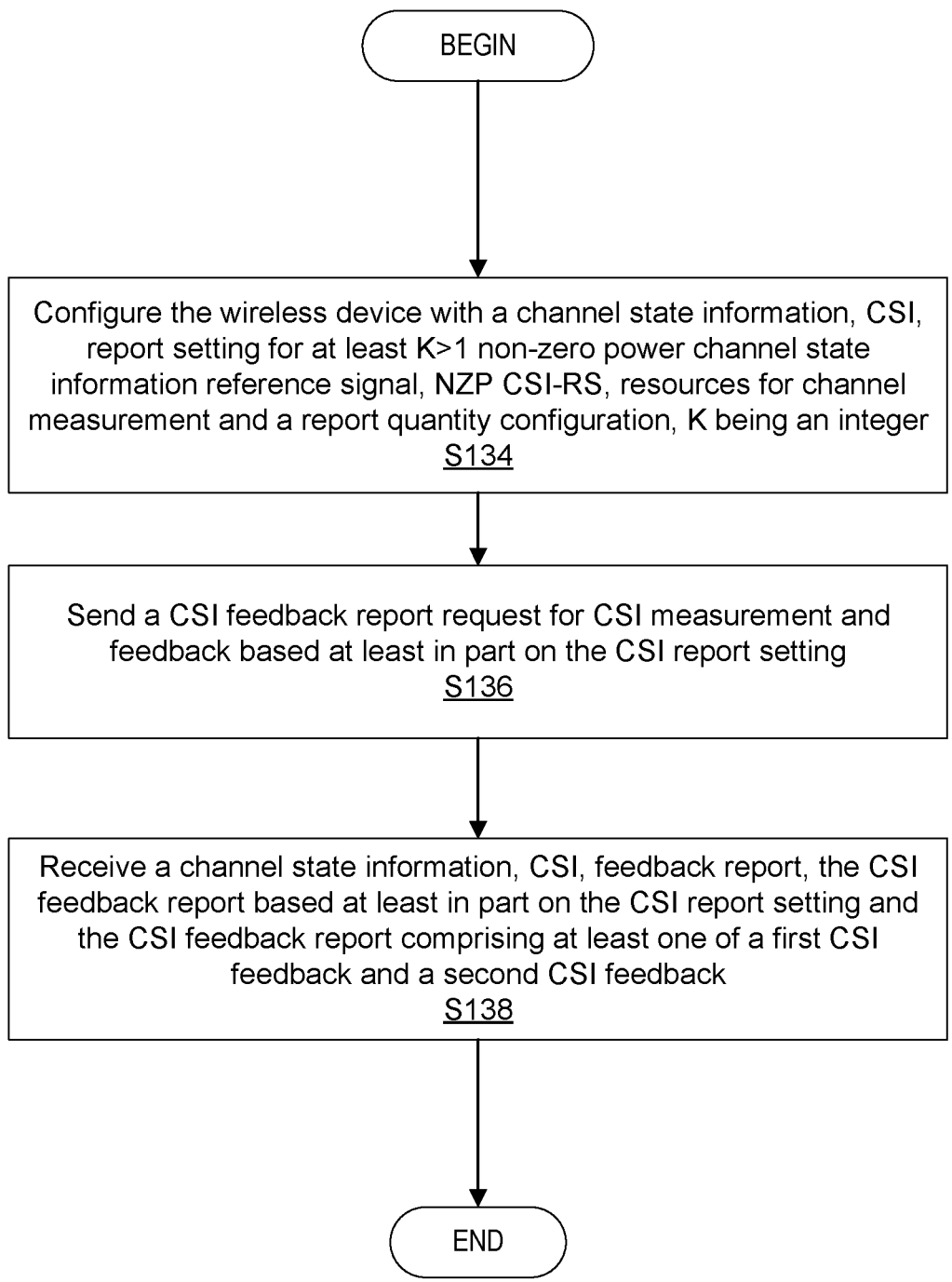
FIG. 15 is a flowchart of an exemplary process in a network node for report setting unit according to some embodiments of the present disclosure.

FIG. 15 is a flowchart of an exemplary process in a network node 16 according to some embodiments of the present disclosure. One or more Blocks and/or functions and/or methods performed by the network node 16 may be performed by one or more elements of network node 16 such as by report setting unit 32 in processing circuitry 68, processor 70, radio interface 62, etc. according to the example method. The example method includes configuring (Block S134), such as via report setting unit 32, processing circuitry 68, processor 70 and/or radio interface 62, a wireless device 22 with a channel state information, CSI, report setting for at least K>1 non-zero power channel state information reference signal, NZP CSI-RS, resources for channel measurement and a report quantity configuration, K being an integer. The method includes sending (Block S136), such as via report setting unit 32, processing circuitry 68, processor 70 and/or radio interface 62, a CSI feedback report request for CSI measurement and feedback based at least in part on the CSI report setting. The method includes receiving (Block S138), such as via report setting unit 32, processing circuitry 68, processor 70 and/or radio interface 62, a channel state information, CSI, feedback report, the CSI feedback report based at least in part on the CSI report setting. The CSI feedback report includes at least one of a first CSI feedback and a second CSI feedback.

In some embodiments, the first CSI feedback includes one CSI associated with each of the K NZP CSI-RS resources. In some embodiments, the second CSI feedback includes a CSI for one of non-coherent joint, NC-JT, transmission and Ultra Reliable Low Latency, URLL, transmission. In some embodiments, the second CSI feedback includes a first rank indicator and a first precoding matrix indicator associated with a first NZP CSI-RS resource and a second rank indicator and a second precoding matrix indicator associated with a second NZP CSI-RS resource, and a joint channel quality indicator conditioned on the first and the second rank and precoding matrix indicators. In some embodiments, the second CSI feedback includes a first rank indicator and a first layer indicator associated with a first NZP CSI-RS resource, and a second rank indicator and a second layer indicator associated with a second NZP CSI-RS resource, and a joint channel quality indicator conditioned on the first and the second rank and layer indicators.

In some embodiments, the second CSI feedback further includes identities of the first and the second NZP CSI-RS resources. In some embodiments, the CSI feedback report includes both of the first CSI feedback and the second CSI feedback. In some embodiments, the CSI feedback report includes the second CSI feedback if each rank of the first CSI feedback is below a threshold value. In some embodiments, the CSI feedback report further includes an indicator indicating whether or not the second CSI feedback is present in the CSI feedback report. In some embodiments, the CSI feedback report includes only the second CSI feedback.

In some embodiments, a method implemented in the network node 16 includes sending, such as via report setting unit 32 and/or processing circuitry 68 and/or radio interface 62, downlink channel transmissions from a single transmission point (TRP) and/or multiple transmission points (multi-trp). The example process includes one or more of the following steps. The process can include configuring, such as via report setting unit 32 and/or processing circuitry 68, the WD 22 with one channel state information (CSI) report setting with K>1 non-zero power channel state information reference signal (NZP CSI-RS) resources, each associated with one TRP. The example process can include requesting, such as via report setting unit 32 and/or processing circuitry 68, a CSI feedback report from the WD 22 assuming data transmission from each one of the K TRPs and data transmission from each of M>1 TRPs of the K TRPs based on the CSI report setting. The example process can include scheduling the downlink channel transmissions to the WD 22 based on the CSI feedback report.

In some embodiments, the CSI feedback report comprises K single TRP CSIs each associated with one of the K NZP CSI-RS resources and if a certain condition is met, one or more CSIs for NC-JT. In some embodiments, the CSI feedback report further comprises an indicator to indicate whether NC-JT CSI is present in the report.

In some embodiments, the CSI feedback report includes one of: CSI for both a single transmission point (TRP) hypothesis and a non-coherent joint transmission (NC-JT) transmission hypothesis; and CSI for one of the single TRP hypothesis and the non-coherent joint transmission (NC-JT) transmission hypothesis. In some embodiments, the CSI feedback report depends on certain conditions. In some embodiments, the CSI feedback report depends on a rank threshold. In some embodiments, the CSI feedback report includes a first part and a second part, a size of the first part being fixed and a size of the second part being dependent on the first part.

Figure 16:
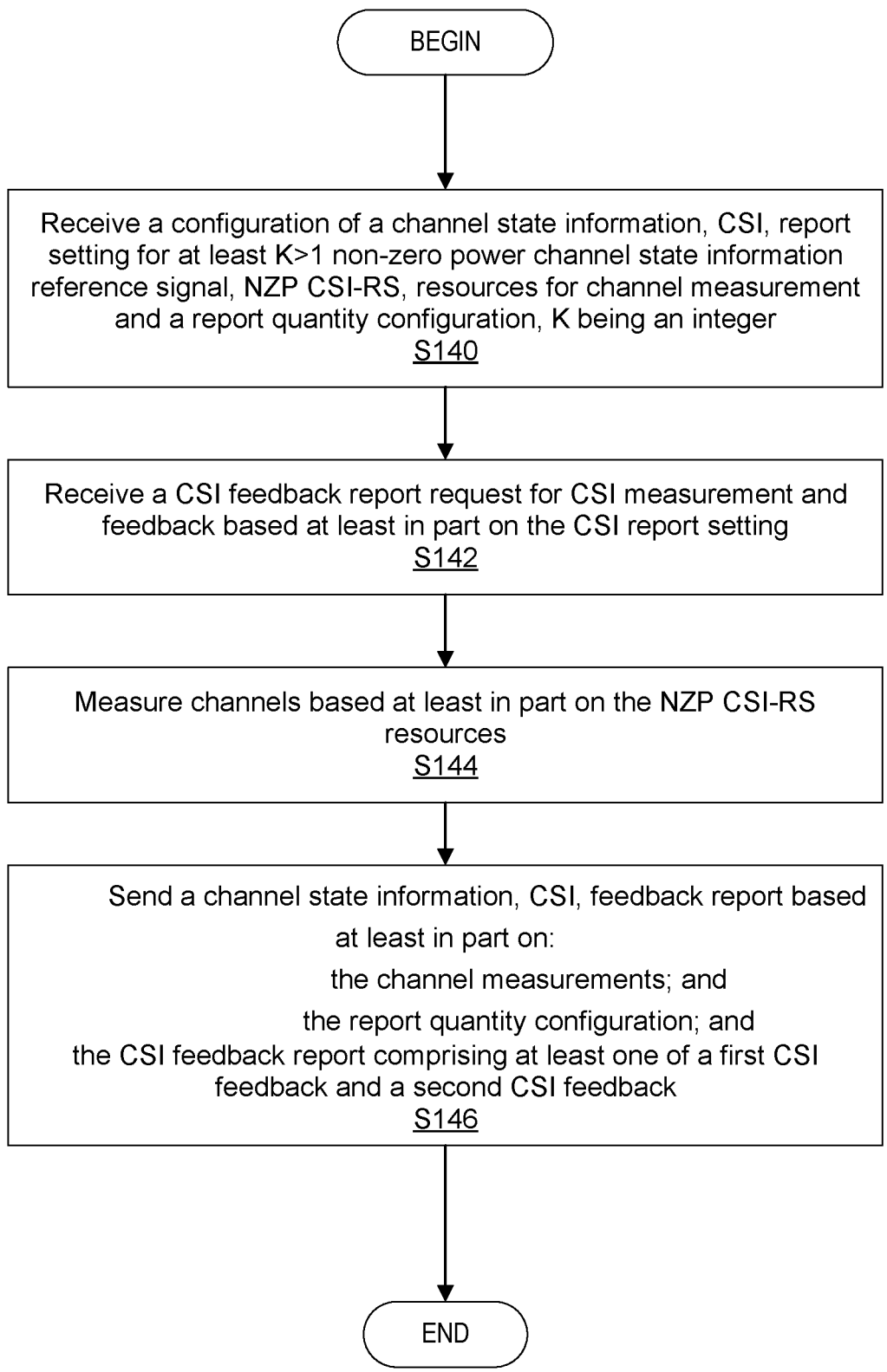
FIG. 16 is a flowchart of an exemplary process in a wireless device for reporting unit according to some embodiments of the present disclosure.

FIG. 16 is a flowchart of an exemplary process in a wireless device 22 according to some embodiments of the present disclosure. One or more Blocks and/or functions and/or methods performed by WD 22 may be performed by one or more elements of WD 22 such as by reporting unit 34 in processing circuitry 84, processor 86, radio interface 82, etc., according to the example method. The example method includes one of more of the following steps. The method may include receiving (Block S140), such as via reporting unit 34, processing circuitry 84, processor 86 and/or radio interface 82, a configuration of a channel state information, CSI, report setting for at least K>1 non-zero power channel state information reference signal, NZP CSI-RS, resources for channel measurement and a report quantity configuration, K being an integer. The method includes receiving (Block S142), such as via reporting unit 34, processing circuitry 84, processor 86 and/or radio interface 82, a CSI feedback report request for CSI measurement and feedback based at least in part on the CSI report setting. The method includes measuring (Block S144), such as via reporting unit 34, processing circuitry 84, processor 86 and/or radio interface 82, channels based at least in part on the NZP CSI-RS resources. The method includes sending (Block S146), such as via reporting unit 34, processing circuitry 84, processor 86 and/or radio interface 82, a channel state information, CSI, feedback report based at least in part on: the channel measurements; and the report quantity configuration. The CSI feedback report includes at least one of a first CSI feedback and a second CSI feedback.

In some embodiments, the first CSI feedback includes one CSI associated with each of the K NZP CSI-RS resources. In some embodiments, the second CSI feedback includes a CSI for one of non-coherent joint, NC-JT, transmission and Ultra Reliable Low Latency, URLL, transmission. In some embodiments, the second CSI feedback includes a first rank indicator and a first precoding matrix indicator associated with a first NZP CSI-RS resource, and a second rank indicator and a second precoding matrix indicator associated with a second NZP CSI-RS resource, and a joint channel quality indicator conditioned on the first and the second rank and precoding matrix indicators. In some embodiments, the second CSI feedback includes a first rank indicator and a first layer indicator associated with a first NZP CSI-RS resource, and a second rank indicator and a second layer indicator associated with a second NZP CSI-RS resource, and a joint channel quality indicator conditioned on the first and the second rank and layer indicators.

In some embodiments, the second CSI feedback further includes identities of the first and the second NZP CSI-RS resources. In some embodiments, the method further includes determining, such as via reporting unit 34, processing circuitry 84, processor 86 and/or radio interface 82, whether to include the second CSI feedback in the CSI feedback report. In some embodiments, determining whether to include the second CSI feedback further includes determining, such as via reporting unit 34, processing circuitry 84, processor 86 and/or radio interface 82, to include the second CSI feedback if each rank of the first CSI feedback is below a threshold value. In some embodiments, the CSI feedback report further includes an indicator indicating whether the second CSI feedback is present in the CSI feedback report. In some embodiments, the CSI feedback report includes only the second CSI feedback.

In some embodiments, the process can include receiving, such as via reporting unit 34 and/or processing circuitry 84 and/or radio interface 82, a CSI feedback request based on a channel state information (CSI) report setting for K>1 non-zero power channel state information reference signal (NZP CSI-RS) resources, each associated with one transmission point (TRP). The example process can include measuring and sending, via reporting unit 34 and/or processing circuitry 84 and/or radio interface 82, a channel state information (CSI) feedback report assuming data transmission from each one of the K TRPs and data transmission from each of M>1 TRPs of the K TRPs based on the received CSI report setting.

In some embodiments, the CSI feedback report comprises K single TRP CSIs each associated with one of the K NZP CSI-RS resources and if a certain condition is met, one or more CSIs for NC-JT. In some embodiments, the CSI feedback report further comprises an indicator to indicate whether NC-JT CSI is present in the CSI feedback report.

In some embodiments, the CSI feedback report depends on certain conditions. In some embodiments, the CSI feedback report depends on a rank threshold. In some embodiments, the CSI feedback report includes a first part and a second part, a size of the first part being fixed and a size of the second part being dependent on the first part.

Having generally described some embodiments for CSI feedback for multi-TRP transmission, which may reduce CSI feedback signaling overhead (as compared to existing techniques), a more detailed description of some of the embodiments is described below, which may be implemented by WD 22, network node 16 and/or host computer 24.

CSI Feedback for Multiple TRPs with Single TRP Transmission Hypothesis

In one embodiment, the DL PDSCH transmission to a WD 22 may be from any one of multiple TRPs. In this case, the network node 16 (e.g., gNB) may benefit from having CSI corresponding to all the TRPs in order to make informed scheduling decisions.

In this embodiment, a single CSI report setting may be configured to the WD 22 to determine CSI assuming a single TRP transmission hypothesis, i.e., the hypothetical PDSCH transmission from one TRP for which the CSI is determined. Henceforth, such a CSI is referred to herein as a "single TRP CSI". However, in contrast to existing techniques, the WD 22 is indicated in the CSI Report Setting as part of the configuration that multiple such single-TRP CSIs are to be determined and reported as part of the CSI report. In some embodiments, the number of single-TRP CSIs to be determined and reported as part of the CSI report is RRC configured to the WD 22.

Assuming CSI feedback for K TRPs is desired, the WD 22 may be higher-layer configured with K NZP CSI-RS resources, {NZP CSI-RS #1, NZP CSI-RS #2, . . . , NZP CSI-RS #K}, for channel measurement and K CSI-IM resources, {CSI-IM #1, CSI-IM #2, . . . , CSI-IM #K}, for interference measurement which are associated with a single CSI report setting, where resource pair {NZP CSI-RS #k, CSI-IM #k} is associated with the k:th TRP. The WD 22 may thus perform a measurement used to determine a single TRP CSI for the k:th TRP, CSI #k, based on resource pair {NZP CSI-RS #k, CSI-IM #k}. In some embodiments, the WD 22 reports all K CSIs, {CSI #1, CSI #2, . . . , CSI #K} as part of a single CSI report in a PUSCH or PUCCH. Each CSI may contain a RI, PMI and one or two CQI (depending on the reported RI).

The WD 22 may not always report all of the K CSI, as those CSIs corresponding to TRPs which e.g., are received with lower power at the WD 22 may not be utilized for scheduling by the network node 16 (e.g., gNB) in practice. In order to balance between scheduling flexibility and CSI feedback overhead, in an embodiment, the WD 22 selects and reports the M (>1) best CSIs out of the K CSIs. In this case, the M associated resource pairs are also reported, for instance using a combinatorial signaling scheme using $$\log_2\left[\binom{K}{M}\right] \text{ bits}$$

of overhead. With the M CSIs, the network node 16 (e.g., gNB) can schedule PDSCH from any of the M associated TRPs.

As distinguishing from the existing CSI reporting in NR Release-15 with the same multiple NZP CSI-RS and CSI-IM configuration, in which a WD 22 first selects one of the resource pair and then measures and reports the corresponding CSI associated to the resource pair, in some embodiments of this disclosure, a new report quantity indicator may be introduced in the CSI report setting to indicate the desired reporting.

Efficient CSI Feedback for NC-JT with Low Overhead

Traditionally, the network node 16 is in control over scheduling single or multi-TRP transmission to a WD 22. Each of these may require different CSI feedback and to be able to dynamically switch between single TRP transmission and NC-JT transmission with multiple TRPs, the network node 16 may have CSI with both transmission hypotheses to make the scheduling decision with correct link adaptation. Unfortunately, feedback of all the CSIs associated with different hypotheses may result in large CSI feedback overhead. Hence, in some embodiments of this disclosure, the WD 22 is configured to take part in the hypothesis selection for CSI feedback, e.g., the WD 22 may select whether to feedback CSI for single, or multiple TRP.

For NC-JT (e.g., where multiple TRPs are simultaneously transmitting to the same WD 22), it has been observed that this feature provides system performance benefit over DPS (e.g., where only one TRP is transmitting to the WD 22) under only (or primarily) the following conditions:

When the WD 22 can receive transmissions from the multiple TRPs with comparable signal strength; which is typically observed by a WD 22 at the cell edge, or in indoor deployments;

The supported rank (number of MIMO layers) from each TRP is low (e.g., 1 or 2 layers) even though the WD 22 is equipped with more receive antennas and is thus capable of receiving more layers than these few layers from a single TRP (this typically occurs when the rank of the propagation channel between a TRP and a WD 22 has low rank, such as in a line of sight channel conditions); and The network load (and thus the resource utilization) is low (typically <30% resource utilization to get large benefits from NC-JT).

Therefore, some embodiments of this disclosure provide that CSI for NC-JT is only reported when the above conditions are met. In some embodiments, in order to achieve this, a rank threshold, $R_{th}$, is introduced for the WD 22, for the WD 22 to dynamically determine, for each CSI report to be fed back, whether NC-JT CSI is reported or not. In some embodiments, the WD 22 may determine whether NC-JT CSI is reported or not based on data throughput estimation, and if the data throughput with NC-JT is lower than the data throughput with single TRP transmission, NC-JT CSI is not reported.

For K TRPs, a WD 22 may be configured with a CSI report setting with K NZP CSI-RS resources for channel measurement and K CSI-IM resources for interference measurement, i.e., {NZP CSI-RS #1, NZP CSI-RS #2, . . . , NZP CSI-RS #K}
{CSI-IM #1, CSI-IM #2, . . . , CSI-IM #K}, where the resource pair {NZP CSI-RS #k, CSI-IM #k}, k=1, . . . , K, is associated with the kth TRP.

In some embodiments, the WD 22 first measures and estimates the single TRP transmission hypothesis CSI based on each CSI resource pair individually. For the kth TRP, CSI #k is determined based on the resource pair {NZP CSI-RS #k, CSI-IM #k}. This results in K CSIs, each corresponding to a single TRP transmission hypotheses, {CSI #1, CSI #2, . . . , CSI #K}. Each CSI may include a RI, a PMI and one or two CQI, i.e. CSI #k=(RI #k, PMI #k, CQI #k).

The WD 22 may then compare the rank of each single TRP CSI with the rank threshold, $R_{th}$, which may be either configured by RRC signaling to the WD 22 or predefined, e.g., in standard specifications. If the rank of any of the K single TRP CSIs exceeds the rank threshold $R_{th}$, a decision is made e.g., by the WD 22, that NC-JT CSI is not reported but the CSI for one or more single TRP transmission hypothesis are reported. In another example, the WD 22 may compare the data throughput with NC-JT and the data throughput with single TRP transmission. If the data throughput with NC-JT is lower than the data throughput with single TRP transmission, NC-JT CSI is not reported When this is the case, it is likely that the WD 22 is close to one of the TRPs, which is good for high rank (larger than R_th) PDSCH transmission from that TRP and not good for scheduling a NC-JT transmission. That is, the network node 16 scheduler would likely not schedule a NC-JT transmission anyway under such a scenario and hence omitting a CSI corresponding to a NC-JT transmission hypothesis will likely not have a negative impact, in some embodiments.

An example with two TRPs is shown in Table 2 (herein below), where $R_{th}=2$. In this example, the WD 22 determines two single-TRP transmission hypothesis CSIs, each of which includes a respective RI. Assuming a maximum RI of 4 for each hypothesis, there are 16 possible combinations which can be reported and which each can be mapped to an index of the table. In some embodiments, NC-JT CSI is only fed back for some of these combinations, corresponding to if the index is 1, 2, 5 or 6, then NC-JT transmission hypothesis CSI is also fed back in addition to the two single-TRP transmission hypothesis CSIs. Therefore, NC-JT CSI is only reported (e.g., by WD 22 to network node 16) in four cases out of the 16 possible rank combinations, resulting in reduced feedback overhead since NC-JT CSI may be omitted for 12 out of the 16 possible cases.

TABLE 2

An example of using a rank threshold $R_{th}$ = 2 for determining whether NC-JT CSI is reported when two TRPs are considered.

| Index | RI (single TRP) | | RI (NC-JT) | |
|---|---|---|---|---|
| | TRP1 | TRP2 | TRP1 | TRP2 |
| 1 | 1 | 1 | 1 | 1 |
| 2 | 1 | 2 | 1 | 1 or 2 |
| 3 | 1 | 3 | x | x |
| 4 | 1 | 4 | x | x |
| 5 | 2 | 1 | 1 or 2 | 1 |
| 6 | 2 | 2 | 1 or 2 | 1 or 2 |
| 7 | 2 | 3 | x | x |
| 8 | 2 | 4 | x | x |

TABLE 2-continued

An example of using a rank threshold $R_{th}$ = 2 for determining whether NC-JT CSI is reported when two TRPs are considered.

| Index | RI (single TRP) | | RI (NC-JT) | |
|---|---|---|---|---|
| | TRP1 | TRP2 | TRP1 | TRP2 |
| 9 | 3 | 1 | x | x |
| 10 | 3 | 2 | x | x |
| 11 | 3 | 3 | x | x |
| 12 | 3 | 4 | x | x |
| 13 | 4 | 1 | x | x |
| 14 | 4 | 2 | x | x |
| 15 | 4 | 3 | x | x |
| 16 | 4 | 4 | x | x |

X no NC-JT CSI report

If the reported RI for all the K single TRP CSIs is below or equal to the threshold, or if the data throughput with NC-JT is lower than the data throughput with single TRP transmission, then CSI for NC-JT is additionally reported, or alternatively reported in lieu of the single-TRP CSIs.

That is, in one embodiment, the single TRP CSI is not reported when NC-JT CSI is reported. Thereby, the WD 22 performs a hypothesis selection and decides between single TRP or multi-TRP CSI feedback. Taking 2 TRPs as an example, let ($R_k$, $W_k$, $Q_k$) denote the rank indicator (RI), precoding matrix indicator (PMI), and CQI corresponding to the kth TRP. In one embodiment, a selection indicator is included (e.g., by WD 22) as part of the CSI report to indicate selection between single TRP CSIs, or multi-TRP CSI (such as NC-JT CSI). If the WD 22 decides to feed back single TRP CSIs, the WD 22 sets the selection indicator such that single TRP CSIs selection is indicated. If the WD 22 decides to feed back multi-TRP CSI, the WD 22 sets the selection indicator such that multiple TRP CSIs selection is indicated. Although the above example is restricted to 2 TRPs, the embodiment can be extended to more than 2 TRPs.

In another embodiment, the single TRP CSI feedback is reported (e.g., by WD 22 to network node 16) also in the NC-JT case (depending on the threshold $R_{th}$). Then the following method can be used to reduce the CSI feedback overhead by reusing or sharing the single TRP PMI feedback information in the NC-JT feedback hypothesis.

In some embodiments, the CSI for NC-JT may include $\{R_k^{NC-JT}, W_k^{NC-JT}, Q_k^{NC-JT}, k=1, \ldots, K\}$, where ($R_k^{NC-JT}$, $W_k^{NC-JT}$, $Q_k^{NC-JT}$) are the NC-JT rank indicator (RI), precoding matrix indicator (PMI), and CQI, respectively, associated with the kith TRP. This assumes that one codeword per TRP is transmitted. If different layers of a codeword are transmitted over different TRPs, then a joint CQI may be determined and reported instead.

When single TRP CSI is reported together with the CSI for NC-JT (e.g., reported by WD 22 to network node 16), then part of the CSI corresponding to the NC-JT transmission hypothesis, such as the PMIs {$W_k^{NC-JT}$, k=1, . . . , K} may need not be reported and may hence in some embodiments be omitted.

Figure 17:
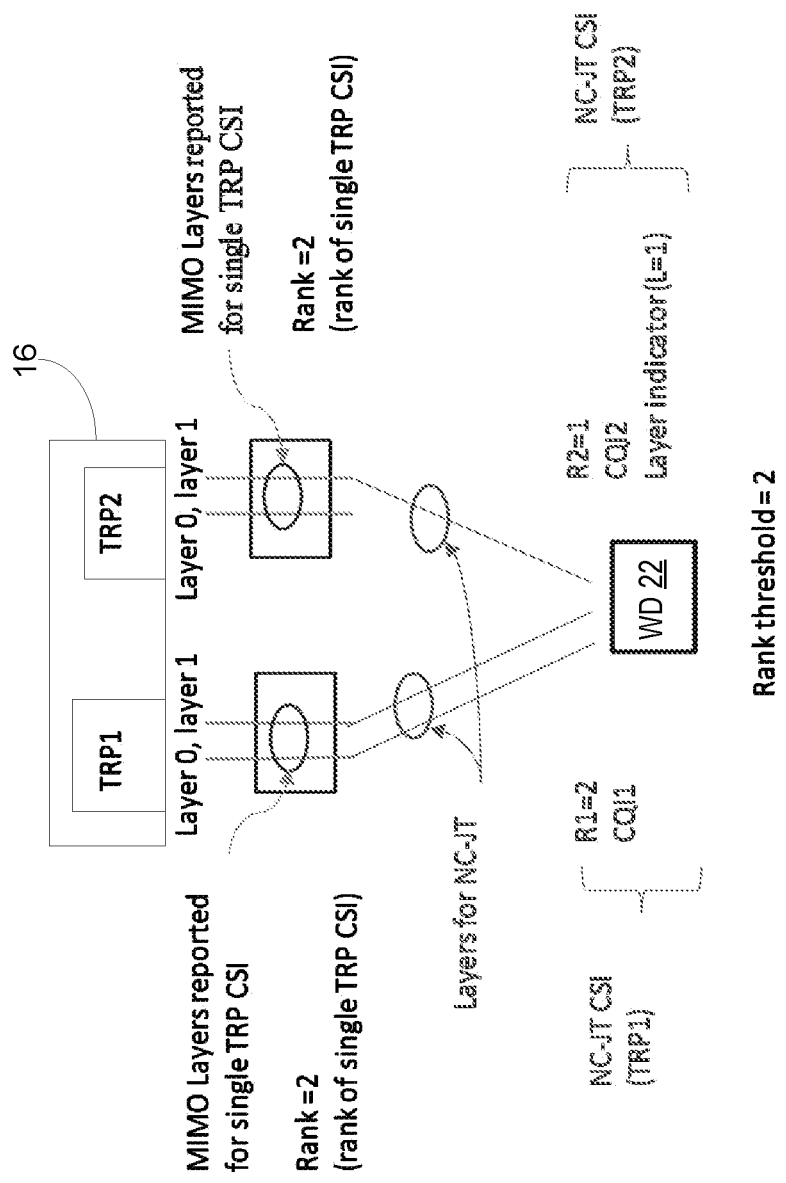
FIG. 17 illustrates an example of layer indication for NC-JT CSI feedback according to some embodiments of the present disclosure.

In one embodiment, if $R_k^{NC-JT}$ is equal to the rank in CSI #k for single TRP transmission hypothesis, then $W_k^{NC-JT}$ for NC-JT is the same as the PMI in CSI #k. If $R_k^{NC-JT}$ is smaller than the rank in CSI #k for single TRP transmission, then a layer indicator (LI) is reported, e.g., ($R_k^{NC-JT}$, $Q_k^{NC-JT}$, $L_k^{NC-JT}$) may be reported for NC-JT CSI for the kth TRP, where $L_k^{NC-JT}$ is the layer indicator for the kth TRP. The layer indicator indicates which subset of layers in the reported single TRP PMI are for NC-JT. Such embodiments may further reduce the feedback overhead for NC-JT CSI. An example is shown in FIG. 17, where the NC-JT rank for TRP2 is 1 (i.e., $R_2^{NC\text{-}JT}=1$) while the rank of the corresponding single TRP CSI is 2. Since the rank threshold is 2 in this example, NC-JT CSI is additionally reported. For TRP1, the same layers reported in single TRP CSI are also used for NC-JT. For TRP2, since the rank for NC-JT is 1 while the rank of single TRP CSI is 2, a layer indicator $L_2^{NC\text{-}JT}$ is used to indicate the layer for NC-JT in TRP2. The layer indicator in this case has selected layer 1, i.e., $L_2^{NC\text{-}JT}=1$. Let the single TRP precoding matrix reported for TRP2 be $W=[w_1, w_2]$, then for NC-JT transmission, $w_2$ may be used by the network node 16 to precode PDSCH transmission over TRP2. For TRP1, because the NC-JT rank is the same as the single TRP CSI rank, the same precoding matrix corresponding to the reported PMI in the single TRP CSI may be used for NC-JT transmission from TRP1. In this example, the WD 22 reports the following CSI:

Single TRP CSIs:
  CSI #1=(RI #1, PMI #1, CQI #1) for TRP #1
  CSI #2=(RI #2, PMI #2, CQI #2) for TRP #2
NC-JT CSI if one CW per TRP is used for NC-JT:
  ($R_1^{NC\text{-}JT}=2$, $Q_1^{NC\text{-}JT}$) associated with TRP #1
  ($R_2^{NC\text{-}JT}=1$, $Q_2^{NC\text{-}JT}$, $L_2^{NC\text{-}JT}=1$) associated with TRP #2
NC-JT CSI if a single CW for two TRP is used for NC-JT:
  $R_1^{NC\text{-}JT}=2$ associated with TRP #1
  ($R_2^{NC\text{-}JT}=1$, $L_2^{NC/JT}=1$) associated with TRP #1
  A joint CQI One benefit of this approach may be that there is no separate PMI reported for NC-JT, which can save a large amount of feedback overhead.

In some scenarios, the number of TRPs, M (1<M<K), participating in NC-JT transmission may be less than the configured K TRPs for CSI reporting. In this case, the WD 22 may first select best M TRPs and then report NC-JT CSI based on the selected TRPs. For example, when K=3 and M=2, the WD 22 may report single TRP CSI for all 3 TRPs, i.e., {CSI #1, CSI #2, CSI #3}. If the ranks of all the three single TRP CSI are equal or less than the rank threshold, $R_{th}$, the WD 22 selects 2 out the 3 TRPs for reporting NC-JT CSI. Otherwise, no NC-JT CSI is reported.

Such selection may be based on certain criteria such as, for example, maximizing WD 22 throughput. The selected TRPs may also be reported using a new definition of CRI, or using another newly introduced indicator. For example, CRI=0 is used to indicate TRP1 and TRP2; CRI=1 to indicate TRP1 and TRP3; CRI=2 to indicate TRP2 and TRP3. The remaining NC-JT CSI measurement and report based on the two selected TRPs may be the same as the NC-JT CSI measurement and reporting discussed above. M may be semi-statically configured by RRC.

In another embodiment, only the possible sets of TRPs (or equivalently CSI-RS resources) that can participate in a NC-JT transmission are the same as configured in the active transmission configuration indicator (TCI) states for PDSCH transmission. In NR Rel.15, each TCI state includes a CSI-RS resource (or SSB index) to be used for time and frequency synchronization) so that DPS can be supported by selecting a different TCI state (i.e., TCI state equals a TRP) dynamically in DCI when scheduling PDSCH. In NR Rel.16, extended TCI states may be supported defined by the fact that each such TCI state includes two or more CSI-RS resources for time/frequency synchronization. Thus, such TCI states can be used for NC-JT scheduling. The combination of TRPs that are viable for selection in CSI reporting of NC-JT may be the same as those configured in these extended and activated TCI states (note that there are non-activated TCI states as well which cannot be used for PDSCH scheduling unless they first are activated by e.g., MAC CE signaling). This also implies that K<M TRPs can be participating in the NC-JT transmission. A typical example is M=3 TRPs and NC-JT with K=2 TRPs, which can be represented by three different active and extended TCI states. Single TRP CSI reporting may also be connected to configured and activated TCI states, where the WD 22 only select single TRP CSI if that CSI-RS resource is among activated TCI states.

In a further extension of the above, the CSI-RS resource indicators (CRI) relates to an activated TCI state. For example, when reporting CRI=0, the selected CSI-RS resource (or resources in case of an extended TCI state) refers to the activated TCI state with the lowest identity and so on.

Note that for CSI feedback purposes, the TRP selection may not be explicitly indicated, rather, a TRP may be implicitly indicated by the indication of a NZP CSI-RS resource configured for channel measurement by which the TRP may be associated.

Two-Part CSI Encoding

For the low overhead NC-JT CSI feedback approach discussed in the previous section, the CSI payload size may vary depending on the rank values of both the single TRP CSI and the NC-JT CSI associated with each TRP. The exact CSI payload size for each CSI may be unknown to the network node 16 prior to receiving the CSI report. In some embodiments, e.g., to ensure correct decoding of the CSI report, the CSI may be divided into two CSI Parts, where each CSI Part is individually encoded. In some embodiments, the payload size of the first CSI Part is deterministic and known to the network node 16 prior to receiving the CSI report, while the payload size of the second CSI Part depends on the information encoded in the first CSI Part. In order to receive the CSI report, the network node 16 may decode the first CSI Part and after successfully decoded, the payload size of the second CSI Part can be determined, which may enable the network node 16 to proceed and decode the second CSI Part.

For that purpose, the first CSI Part may include the ranks of single TRP CSI for all the K TRPs, i.e., {RI #1, . . . , RI #K}. In addition, the first CPSI part may also include an NC-JT CSI present indicator which explicitly indicates whether NC-JT CSI is present in the second part. For each TRP, the payload size of the single TRP PMI and whether one or two CQIs is present may also depend on the rank of the corresponding single TRP CSI and thus the PMIs and at least the CQI for the second codeword (if present) may be included in the second CSI Part. The NC-JT CSI may also depend on the ranks of the single TRP CSI and may thus be included in the second CSI Part. The NC-JT layer indicator for each TRP may also depend on the NC-JT rank for the TRP, but a fixed bit length may be used to avoid introducing a third CSI Part, in some embodiments. For example, if Rth=2, then 1 bit per TRP is allocated, with bit value "0" for layer 0 and "1" for layer 1 if the NC-JT rank for the TRP is 1 and the bit is ignored if the NC-JT rank is 2. If CRI is used to select M out of K TRPs for NC-JT, the CRI may also be included in the second part.

Low Overhead CSI Feedback for URLLC

URLLC transmission may be considered different from the previous use cases in the sense that the main target may not be to maximize the spectral efficiency, rather to maximize the robustness of the transmission by transmitting the same data payload from multiple TRPs. Because a WD 22 may support both normal Enhanced Mobile Broadband (eMBB) services with normal reliability requirements at the same time as URLLC traffic, some embodiments of this disclosure may provide for unifying the CSI feedback for both these use cases.

Hence, to support dynamic switching between single TRP transmission and URLLC transmission over K (K>1) TRPs, a WD 22 can be configured with a CSI report setting with K NZP CSI-RS resources for channel measurement and CSI-IM resources for interference measurement, i.e., {NZP CSI-RS #1, NZP CSI-RS #2, . . . , NZP CSI-RS #K}
{CSI-IM #1, CSI-IM #2, . . . , CSI-IM #K}, where resource pair {NZP CSI-RS #k, CSI-IM #k} is associated with the kth TRP. The WD 22 may first measure single TRP transmission hypothesis CSI for each resource pair. For the kth TRP, CSI #k is measured based on resource pair {NZP CSI-RS #k, CSI-IM #k}. This results in K single TRP transmission hypothesis CSI, {CSI #1, CSI #2, . . . , CSI #K}. Each such CSI may include a RI, a PMI and one or two CQI, i.e. CSI #k=(RI #k, PMI #k, CQI #k).

Figure 18:
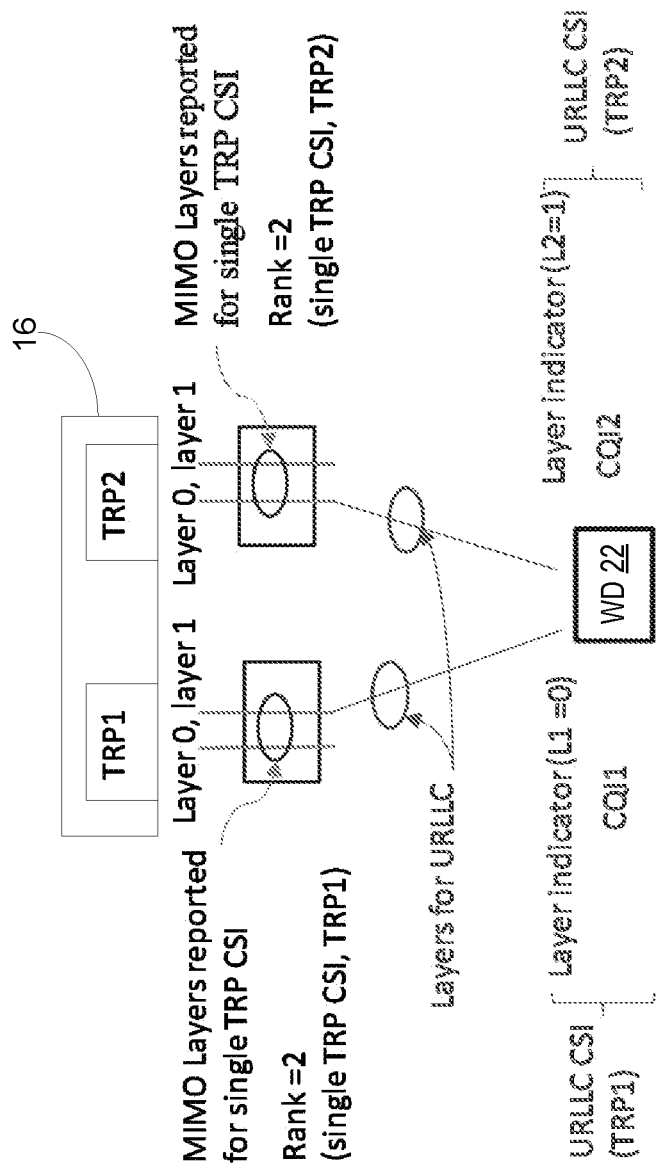
FIG. 18 illustrates an example of CSI feedback for URLLC according to some embodiments of the present disclosure.

For URLLC, in one scenario, the reported rank for all the TRPs is the same, particularly only rank 1 transmission from each TRP may be allowed. In this case, the rank may not be reported in the URLLC CSI. The single layer for URLLC may be selected from the layers reported in single TRP transmission hypothesis CSI. The selection can be aimed to maximize the signal-to-noise-and-interference ratio (SINR). Therefore, PMI may not be reported in the URLLC CSI feedback. Instead, a layer indicator (LI) may be used to indicate one of the layers in single TRP hypothesis CSI for each TRP. If a separate codeword is sent from each TRP, then a CQI may also be reported for each TRP. Thus, the reported URLLC CSI may include $\{L_k^{URLLC}, Q_k^{URLLC}, k=1, \ldots, K\}$, where $(L_k^{URLLC}, Q_k^{URLLC})$ are the layer indicator and CQI for the kth TRP, respectively. An example is shown in FIG. 18, where two TRPs are used. In this example, layer 1 is selected in TRP1, while layer 0 is selected in TRP2 for URLLC. In this example, the WD 22 may report the following CSI:

Single TRP CSIs:
  CSI #1=(RI #1, PMI #1, CQI #1) for TRP #1
  CSI #2=(RI #2, PMI #2, CQI #2) for TRP #2
URLLC CSI:
  $(L_1^{URLLC}=1, Q_1^{URLLC})$ associated with TRP #1
  $(L_2^{URLLC}=0, Q_2^{URLLC})$ associated with TRP #2

One benefit of this approach may be that there is no PMI reported for URLLC, which can save a large amount of feedback overhead.

In some embodiments, if a single CW is transmitted over all TRPs, then a single CQI may be reported. Thus, the reported URLLC CSI includes $\{L_k^{URLLC}, Q^{URLLC}, k=1, \ldots, K\}$, is a joint CQI.

In another scenario, if up to rank 2 is also supported for URLLC, the rank per TRP for URLLC may also be reported together with the layer and CQI indicators. Thus, the URLLC CSI may include $\{R_k^{URLLC}, L_k^{URLLC}, Q_k^{URLLC}, k=1, \ldots, K\}$.

In URLLC, either the same or different resources may be used in each TRP. In case the same resource is used in all TRPs, the WD 22 may take the inter-TRP interference into account when calculating the CSI. In addition, the WD 22 may be required to know the type of soft combining, i.e., IR or CC, to be able to measure the CSI correctly. Therefore, the information on whether the same of different resource is used, the soft combining type, and whether SFN-type of transmission is used may be either signaled from the network to the WD 22 or predefined/predetermined.

In one embodiment, when non-overlapping resources are used for the multiple TRP (i.e., the resources associated with the different TRPs do not overlap in frequency domain, time domain or both), then there may be no inter-TRP interference. In this case of scheduling with non-overlapping resources, then URLLC CSI may not be necessary and single TRP CSI can be used by the scheduler. In some embodiments, when the WD 22 is configured for URLLC transmission in non-overlapping resources, then the WD 22 only feeds back single TRP CSIs and URLLC CSI may be skipped.

NC-JT or URLLC CSI Only Feedback

In this embodiment, CSI reporting for NC-JT or URLLC is configured separately from single TRP CSI reporting. For example, a WD 22 may be configured (e.g., by network node 16) with a CSI reporting setting with K>1 NZP CSI-RS resources for channel measurement and one or K CSI-IM resource for interference measurement, where each of the K NZP CSI-RS resources is associated with a TRP. In the CSI reporting setting, an indicator may also be configured to indicate whether the CSI reporting is for NC-JT or URLLC. A rank restriction per TRP or NZP CSI-RS resource may also be included in the CSI reporting setting such that a maximum rank per TRP is applied.

For NC-JT, the WD 22 may select and report back a preferred 1<M<K TRPs (or NZP CSI-RS resources) and the associated NC-JT CSI, where M may be either predefined in the standards or signaled to the WD 22, such as by network node 16 via RRC signaling. The NC-JT CSI may include a rank indicator and a precoding matrix indicator for each selected TRP as well as a channel quality indicator for each codeword. In some embodiments, the NC-JT CSI reporting may be triggered only when a certain condition is met in single TRP CSI feedback. For example, the network node 16 determines through single TRP CSI feedback and/or reference signal received power (RSRP) reports that the WD 22 is at the cell edge and is in line of sight (LOS) condition to two TRPs.

For URLLC, an indicator on whether the same or non-overlapping frequency resources would be used in each TRP may be included in the report setting (e.g., by network node 16). In addition, an indicator on whether the transmission would be repeated in time may also be included in some embodiments.

Some embodiments may include one or more of the following embodiments: Joint single TRP and multi-TRP CSI feedback 1. A method of CSI feedback, e.g. for dynamically switching PDSCH transmissions between a single transmission point (TRP) and multiple transmission points to a WD 22 in a wireless network, wherein the method comprising one or more of:
   Configuring, e.g. by a network node 16, the WD 22 with one or more CSI reporting setting containing K>1 NZP CSI-RS resources, each associated with one TRP;
   Requesting, e.g. by a network node 16, CSI feedback from the WD 22 based on one or more CSI reporting setting; and
   Measuring and/or reporting, by the WD 22, CSI with one or both single TRP transmission hypotheses and multi-TRP transmission hypotheses; and/or
   Scheduling, e.g by the network node 16, PDSCH transmissions to the WD 22 according to CSI feedback.

2. The method of embodiment 1, wherein the one or more CSI reporting setting further contain K>1 CSI-IM resources for interference measurement.
3. The method of embodiments 1 and 2, wherein the CSI for single TRP transmission hypotheses comprises one CSI for each of the K>1 NZP CSI-RS resources.
4. The method of embodiments 1 to 3, wherein the CSI for single TRP transmission hypotheses associated with each NZP CSI-RS resource further comprises one or more of a rank indicator (RI), a precoding matric indicator (PMI), and a channel quality indicator (CQI).
5. The method of embodiments 1 to 4, wherein the CSI for multi-TRP transmission hypotheses comprises a CSI for either one or both non-coherent joint transmission (NC-JT) or Ultra reliable low latency (URLLC) transmissions.
6. The method of embodiments 1 to 5, wherein CSI for NC-JT is measured and/or reported only when certain conditions are met, wherein the conditions can be that the ranks of the CSI for single TRP transmission are all below a threshold, or the data throughput with NC-JT is lower than the data throughput with single TRP transmission.
7. The method of embodiment 6, wherein the threshold is either signaled to the WD 22 or pre-specified.
8. The method of embodiments 1 to 6, wherein the CSI for NC-JT comprises a rank indicator, and/or a layer indicator, and/or a channel quality indicator for each of the K>1 NZP CSI-RS resources.
9. The method of embodiment 8, wherein the layer indicator associated with a NZP CSI-RS resource indicates the MIMO layer(s) in the single TRP CSI associated with the same NZP CSI-RS resource for NC-JT transmission.
10. The method of embodiments 8 to 9, wherein the layer indicator indicates implicitly a precoding matrix for NC-JT, wherein the precoding matrix comprises a subset of column(s) of the precoding matrix associated with the single TRP CSI.
11. The method of embodiments 1 to 10, wherein when the K NZP CSI-RS resources configured in the one or more CSI report setting is larger than the number of TRPs, M>1, for NC-JT transmission, the WD 22 may first select M NZP CSI-RS resources and then measure, and/or report NC-JT CSI based on the M selected NZP CSI-RS resources.
12. The method of embodiment 11, wherein the selected M NZP CSI-RS resources are also reported as part of the NC-JT CSI.
13. The method of embodiments 1 to 5, wherein the CSI for URLLC may be measured based on all or subset of the K NZP CSI-RS resources and/or if a subset of the K NZP CSI-RS resources is used, the selected subset may also be reported.
14. The method of embodiments 1 to 13, wherein for URLLC the WD 22 is also signaled with (i.e. receives, e.g. via a network node) information on whether fully overlapping or non-overlapping resources are to be used in the K TRPs.
15. The method of embodiments 1 to 14, wherein the CSI for URLLC comprises one or more of a rank indicator, a layer indicator for each of the K>1 NZP CSI-RS resources, and a channel quality indicator.
16. The method of embodiment 15, wherein the layer indicator indicates, e.g. implicitly a precoding matrix for URLLC transmission, wherein, optionally, the precoding matrix comprises a subset of column(s) of the precoding matrix associated with the single TRP CSI.
17. The method of embodiment 5, wherein an indication whether the CSI is for NZ-JT or URLLC is either configured in the CSI report setting or signaled separately to the WD 22.
18. The method of embodiments 1 to 15, wherein the CSI report contains a first part and a second part, where the size of the first part is fixed while the size of the second part is dependent on the first part.
19. The method of embodiment 18, wherein the first part comprises one or more of rank indicators for single TRP CSI and an indicator on whether NC-JT CSI is present, and the second part contains the rest of the CSI feedback
20. The method of embodiment 9, wherein the first part is encoded first before encoding the second part at the WD 22.
21. The method of embodiments 9 toll, wherein the first part is decoded first at a network node.

Separate Single TRP and Multi-TRP CSI Feedback:
1. A method of CSI feedback, e.g. for dynamically switching PDSCH transmissions between a single transmission point (TRP) and multiple transmission points to a WD 22 in a wireless network, wherein the method comprising one or more of:
   Configuring, e.g., by a network node 16, a WD 22 with one or more CSI reporting setting containing K>1 NZP CSI-RS resources, each associated with one TRP;
   Requesting, e.g. by a network node 16, CSI feedback from a WD 22 based on one or more CSI reporting setting;
   Measuring and/or reporting, by a WD 22, CSI with either single TRP transmission hypotheses or multi-TRP transmission hypotheses;
   Scheduling, e.g. by a network node 16, PDSCH transmissions to a WD 22 according to the CSI feedback.
2. The method of (1), wherein the one or more CSI reporting setting further contains K>1 CSI-IM resources for interference measurement.
3. The method of (1), wherein an indication whether the CSI feedback is for single TRP transmission hypotheses or multi-TRP transmission hypotheses is signaled in the CSI report setting.
4. The method of (1), wherein the CSI for single TRP transmission hypotheses comprises K CSIs each measured over a pair of resources from the K NZP CSI-RS resources and CSI-IM resources, where K is an integer>=1.
5. The method of (4), wherein each of the K CSIs comprises one or more of a rank indicator (RI), a precoding matrix indicator (PMI), and a channel quality indicator (CQI).
6. The method of (1), wherein the multi-TRP transmission hypotheses can be either for NC-JT transmission or URLLC transmission.
7. The methods of (1) to (6), wherein an indication whether the CSI is for NC-JT or URLLC is signaled either in the CSI report setting or separately.
8. The methods of (1) to (6), wherein the CSI for multi-TRP transmission hypotheses comprises one or more of a RI, a PMI, and a CQI associated with each of the K NZP CSI-RS resources.
9. The methods of (1) to (6), wherein the CSI for multi-TRP transmission hypotheses comprises one or more of a RI and a PMI associated with each of the K NZP CSI-RS resources, and a CQI.

10. The method of (1) to (8), wherein the WD 22 may first select M<K NZP CSI-RS resources out of the K NZP CSI-RS resources and measure and/or report multi-TRP CSI based on the selected M NZP CSI-RS resources.

11. The method of (9), wherein the selected M NZP CSI-RS resources are also reported as a CSI-RS resource indicator (CRI).

12. The method of (1) to (11), wherein for URLLC the WD 22 is also signaled with (i.e., receives) information on whether fully overlapping or non-overlapping resources are to be used in the K TRPs.

In addition, some embodiments of the present disclosure may include one or more of the following:

Embodiment A1. A network node configured to communicate with a wireless device (WD), the network node configured to, and/or comprising a radio interface and/or comprising processing circuitry configured to perform one of more of:
  send downlink channel transmissions from a single transmission point (TRP) and/or multiple transmission points (multi-trp);
  configure the WD with one channel state information (CSI) report setting with K>1 non-zero power channel state information reference signal (NZP CSI-RS) resources, each associated with one TRP; and/or
  request a CSI feedback report from the WD based on the CSI report setting by assuming data transmission from each one of the K TRPs and data transmission from each of M>1 TRPs of the K TRPs; and/or
  schedule the downlink channel transmissions to the WD based on the CSI feedback report.

Embodiment A2. The network node of Embodiment A1, wherein the CSI feedback report comprises K single TRP CSIs each associated with one of the K NZP CSI-RS resources and if a certain condition is met, one or more CSIs for NC-JT transmission.

Embodiment A3. The network node of Embodiment A1, wherein the CSI feedback report further comprises an indicator to indicate whether NC-JT CSI is present in the report.

Embodiment A4. The network node of Embodiment A1, wherein the CSI feedback report includes a first part and a second part, a size of the first part being fixed and a size of the second part being dependent on the first part.

Embodiment B1. A method implemented in a network node, the method comprising one or more of:
  sending downlink channel transmissions from a single transmission point (TRP) and/or multiple transmission points (multi-trp);
  configuring the WD with one channel state information (CSI) report setting with K>1 non-zero power channel state information reference signal (NZP CSI-RS) resources, each associated with one TRP; and/or
  requesting a CSI feedback report from the WD assuming data transmission from each one of the K TRPs and data transmission from each of M>1 TRPs of the K TRPs based on the CSI report setting; and/or
  scheduling the downlink channel transmissions to the WD based on the CSI feedback report.

Embodiment B2. The method of Embodiment B1, wherein the CSI feedback report comprises K single TRP CSIs each associated with one of the K NZP CSI-RS resources and if a certain condition is met, one or more CSIs for NC-JT.

Embodiment B3. The method of Embodiment B1, wherein the CSI feedback report further comprises an indicator to indicate whether NC-JT CSI is present in the report.

Embodiment B4. The method of Embodiment B1, wherein the CSI feedback report includes a first part and a second part, a size of the first part being fixed and a size of the second part being dependent on the first part.

Embodiment C1. A wireless device (WD) configured to communicate with a network node, the WD configured to, and/or comprising a radio interface and/or processing circuitry configured to perform one or more of:
  receive a CSI feedback request based on one channel state information (CSI) report setting with K>1 non-zero power channel state information reference signal (NZP CSI-RS) resources, each associated with one transmission point (TRP); and/or
  measure and feedback a channel state information (CSI) feedback report assuming data transmission from each one of the K TRPs and data transmission from each of M>1 TRPs of the K TRPs based on the received CSI report setting.

Embodiment C2. The WD of Embodiment C1, wherein the CSI feedback report comprises K single TRP CSIs each associated with one of the K NZP CSI-RS resources and if a certain condition is met, one or more CSIs for NC-JT.

Embodiment C3. The WD of Embodiment C1, wherein the CSI feedback report further comprises an indicator to indicate whether NC-JT CSI is present in the CSI feedback report.

Embodiment C4. The WD of Embodiment C1, wherein the CSI feedback report includes a first part and a second part, a size of the first part being fixed and a size of the second part being dependent on the first part.

Embodiment D1. A method implemented in a wireless device (WD), the method comprising one or more of:
  receiving a CSI feedback request based on a channel state information (CSI) report setting for K>1 non-zero power channel state information reference signal (NZP CSI-RS) resources, each associated with one transmission point (TRP); and/or
  measuring and sending a channel state information (CSI) feedback report assuming data transmission from each one of the K TRPs and data transmission from each of M>1 TRPs of the K TRPs based on the received CSI report setting.

Embodiment D2. The method of Embodiment D1, wherein the CSI feedback report comprises K single TRP CSIs each associated with one of the K NZP CSI-RS resources and if a certain condition is met, one or more CSIs for NC-JT.

Embodiment D3. The method of Embodiment D1, wherein the CSI feedback report further comprises an indicator to indicate whether NC-JT CSI is present in the CSI feedback report.

Embodiment D4. The method of Embodiment D1, wherein the CSI feedback report includes a first part and a second part, a size of the first part being fixed and a size of the second part being dependent on the first part.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device, the method comprising:
receiving a configuration of a channel state information, CSI, report setting for at least K>1 non-zero power channel state information reference signal, NZP CSI-RS, resources for channel measurement and a report quantity configuration, K being an integer;
receiving a CSI feedback report request for CSI measurement and feedback based at least in part on the CSI report setting;
measuring channels based at least in part on the NZP CSI-RS resources; and
sending a channel state information, CSI, feedback report based at least in part on:
the channel measurements; and
the report quantity configuration; and
the CSI feedback report comprising a first CSI feedback and a second CSI feedback.

2. The method of claim 1, wherein the first CSI feedback comprises one CSI associated with each of the K NZP CSI-RS resources.

3. The method of claim 1, wherein the second CSI feedback comprises a CSI for one of non-coherent joint, NC-JT, transmission and Ultra Reliable Low Latency, URLL, transmission.

4. The method of claim 1, wherein the second CSI feedback comprises a first rank indicator and a first precoding matrix indicator associated with a first NZP CSI-RS resource, and a second rank indicator and a second precoding matrix indicator associated with a second NZP CSI-RS resource, and a joint channel quality indicator conditioned on the first and the second rank and precoding matrix indicators.

5. The method of claim 1, wherein the second CSI feedback comprises a first rank indicator and a first layer indicator associated with a first NZP CSI-RS resource, and a second rank indicator and a second layer indicator associated with a second NZP CSI-RS resource, and a joint channel quality indicator conditioned on the first and the second rank and layer indicators.

6. The method of claim 1, wherein the second CSI feedback further comprises identities of the first and the second NZP CSI-RS resources.

7. The method of claim 1, further comprising:
determining whether to include the second CSI feedback in the CSI feedback report.

8. The method of claim 1, wherein the CSI feedback report further comprises an indicator indicating whether the second CSI feedback is present in the CSI feedback report.

9. A method implemented in a network node, the method comprising:
configuring a wireless device with a channel state information, CSI, report setting for at least K>1 non-zero power channel state information reference signal, NZP CSI-RS, resources for channel measurement and a report quantity configuration, K being an integer;
sending a CSI feedback report request for CSI measurement and feedback based at least in part on the CSI report setting; and
receiving a channel state information, CSI, feedback report, the CSI feedback report based at least in part on the CSI report setting; and
the CSI feedback report comprising a first CSI feedback and a second CSI feedback.

10. The method of claim 9, wherein the first CSI feedback comprises one CSI associated with each of the K NZP CSI-RS resources.

11. The method of claim 9, wherein the second CSI feedback comprises a CSI for one of non-coherent joint, NC-JT, transmission and Ultra Reliable Low Latency, URLL, transmission.

12. The method of claim 9, wherein the second CSI feedback comprises a first rank indicator and a first precoding matrix indicator associated with a first NZP CSI-RS resource and a second rank indicator and a second precoding matrix indicator associated with a second NZP CSI-RS resource, and a joint channel quality indicator conditioned on the first and the second rank and precoding matrix indicators.

13. The method of claim 9, wherein the second CSI feedback comprises a first rank indicator and a first layer indicator associated with a first NZP CSI-RS resource, and a second rank indicator and a second layer indicator associated with a second NZP CSI-RS resource, and a joint channel quality indicator conditioned on the first and the second rank and layer indicators.

14. The method of claim 9, wherein the second CSI feedback further comprises identities of the first and the second NZP CSI-RS resources.

15. A wireless device configured to communicate with a network node, the wireless device comprising processing circuitry configured to cause the wireless device to:
receive a configuration of a channel state information, CSI, report setting for at least K>1 non-zero power channel state information reference signal, NZP CSI-RS, resources for channel measurement and a report quantity configuration, K being an integer;
receive a CSI feedback report request for CSI measurement and feedback based at least in part on the CSI report setting;
measure channels based at least in part on the NZP CSI-RS resources; and
send a channel state information, CSI, feedback report based at least in part on:
the channel measurements; and
the report quantity configuration; and
the CSI feedback report comprising a first CSI feedback and a second CSI feedback.

16. The wireless device of claim 15, wherein the first CSI feedback comprises one CSI for each of the K NZP CSI-RS resources.

17. The wireless device of claim 15, wherein the second CSI feedback comprises a CSI for one of non-coherent joint, NC-JT, transmission and Ultra Reliable Low Latency, URLL, transmission.

18. The wireless device of claim 15, wherein the second CSI feedback comprises a first rank indicator and a first precoding matrix indicator associated with a first NZP CSI-RS resource and a second rank indicator and a second precoding matrix indicator associated with a second NZP CSI-RS resource, and a joint channel quality indicator conditioned on the first and the second rank and precoding matrix indicators.

19. The wireless device of claim 15, wherein the second CSI feedback comprises a first rank indicator and a first layer indicator associated with a first NZP CSI-RS resource, and a second rank indicator and a second layer indicator associated with a second NZP CSI-RS resource, and a joint channel quality indicator conditioned on the first and the second rank and layer indicators.

20. The wireless device of claim 15, wherein the second CSI feedback further includes identities of the first and the second NZP CSI-RS resources.

* * * * *